United States Patent
Yang et al.

(10) Patent No.: US 10,292,101 B2
(45) Date of Patent: May 14, 2019

(54) PEAK-TO-AVERAGE POWER MANAGEMENT IN WIRELESS LOCAL AREA NETWORK SIGNALING

(71) Applicant: QUALCOMM Incorporated, San Diego, CA (US)

(72) Inventors: Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/588,360

(22) Filed: May 5, 2017

(65) Prior Publication Data

US 2017/0332323 A1 Nov. 16, 2017

Related U.S. Application Data

(60) Provisional application No. 62/335,019, filed on May 11, 2016.

(51) Int. Cl.
*H04W 52/02* (2009.01)
*H04L 5/00* (2006.01)
(Continued)

(52) U.S. Cl.
CPC ....... *H04W 52/0216* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

| 7,515,651 B1* | 4/2009 | Haddadin | H04L 27/36 332/103 |
| 2015/0117428 A1* | 4/2015 | Lee, II | H04L 27/206 370/338 |

(Continued)

FOREIGN PATENT DOCUMENTS

WO   WO-2015198139 A1   12/2015

OTHER PUBLICATIONS

ISA/EP, International Search Report and Written Opinion of the International Searching Authority, Int'l Application No. PCT/US2017/031563, dated Aug. 4, 2017, European Patent Office, Rijswijk, NL, 14 pgs.

(Continued)

*Primary Examiner* — Candal Elpenord
(74) *Attorney, Agent, or Firm* — Holland & Hart LLP

(57) ABSTRACT

Methods, systems, and devices for wireless communication are described. A wireless device, such as a device in a wireless local area network, may use a radio frame structure that includes a high efficiency (HE) signal field and an HE data field for communications, for example, over shared radio frequency spectrum. One or more bits or symbols within the HE signal field may be adjusted to avoid a high peak-to-average power ratio (PAPR). In some cases, the adjustment may be to a signal A (SIG-A) or signal B (SIG-B) field. In some examples, a random bit sequence may be used for padding in a signal field. In other examples, bits may be reversed or scrambled. In yet other examples, bits may be modulated and a phase rotation may be applied to the corresponding signal.

30 Claims, 18 Drawing Sheets

(51) Int. Cl.
 H04L 27/26 (2006.01)
 H04L 27/34 (2006.01)
 H04W 84/12 (2009.01)
(52) U.S. Cl.
 CPC ...... *H04L 27/2602* (2013.01); *H04L 27/2615* (2013.01); *H04L 27/2621* (2013.01); *H04L 27/3411* (2013.01); *H04W 84/12* (2013.01); *Y02D 70/10* (2018.01); *Y02D 70/1222* (2018.01); *Y02D 70/14* (2018.01); *Y02D 70/142* (2018.01); *Y02D 70/146* (2018.01); *Y02D 70/21* (2018.01); *Y02D 70/22* (2018.01)

(56) References Cited

U.S. PATENT DOCUMENTS

| | | | |
|---|---|---|---|
| 2016/0112899 A1* | 4/2016 | Kenney | H04W 52/241 370/338 |
| 2016/0261451 A1* | 9/2016 | Li | H04L 27/2649 |
| 2017/0047971 A1* | 2/2017 | Seok | H04L 27/2602 |
| 2017/0104553 A1* | 4/2017 | Liu | H04L 1/0041 |

OTHER PUBLICATIONS

Lanante Jr., "Phase Rotation for the 80 MHz 802.11ac Mixed Mode Packet," IEEE, Jul. 12, 2010, 14 pgs, doc: IEEE 802.11-10/0791r0; XP017676655, Institute of Electrical and Electronics Engineers, Piscataway, NJ, USA.

Tian B. et al., "PAPR Reduction for HE SIG-B", IEEE, May 16, 2016, 21 pgs., doc: IEEE 802.11-16/0619r0, XP055394514, Institute of Electrical and Electronics Engineers.

\* cited by examiner

PEAK-TO-AVERAGE POWER MANAGEMENT IN WIRELESS LOCAL AREA NETWORK SIGNALING

CROSS REFERENCES

The present application for patent claims priority to U.S. Provisional Patent Application No. 62/335,019 by Yang et al., entitled "Peak-To-Average Power Management In Wireless Local Area Network Signaling," filed May 11, 2016, assigned to the assignee hereof.

BACKGROUND

The following relates generally to wireless communication and more specifically to peak-to-average power ratio (PAPR) management in wireless local area network signaling.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi network (i.e., a network operating according to an IEEE 802.11 series standard) may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the station, and the uplink (or reverse link) may refer to the communication link from the station to the AP.

Some wireless devices may communicate using high efficiency transmissions. The structure of these high efficiency transmissions, such as the sequence of bits of various high efficiency radio frame fields, may affect various attributes of the transmissions. So high efficiency transmissions made using frame structures or signaling fields designed according to earlier versions of wireless communications standards may result in inefficiencies within a WLAN.

SUMMARY

A wireless device may utilize a radio frame structure that includes a high efficiency (HE) signal field and an HE data field for communications over, for example, shared radio frequency spectrum. One or more bits or symbols within the HE signal field may be adjusted to avoid a high peak-to-average power ratio (PAPR). For example, a portion of a signal A (SIG-A) or signal B (SIG-B) field may be adjusted. In some examples, a random bit sequence may be used for padding at the end of a symbol. In other examples, bits may be reversed or scrambled. In yet other examples, bits may be modulated and a phase rotation may be applied to the corresponding signal. Additionally or alternatively, selective encoding may be used for a SIG-A or SIG-B field to avoid a high PAPR condition. The radio frame with the adjusted HE signal field may then be transmitted with a lower PAPR than might otherwise be realized.

A method of wireless communication is described. The method may include identifying a radio frame structure that includes an HE signal field and an HE data field for communication, generating the HE signal field using a random bit sequence as padding bits for an orthogonal frequency division multiplexing (OFDM) symbol, and transmitting a radio frame with the HE signal field that includes the random bit sequence as padding bits.

An apparatus for wireless communication is described. The apparatus may include means for identifying a radio frame structure that includes an HE signal field and an HE data field for communication, means for generating the HE signal field using a random bit sequence as padding bits for an OFDM symbol, and means for transmitting a radio frame with the HE signal field that includes the random bit sequence as padding bits.

Another apparatus for wireless communication is described. The apparatus may include a processor, memory in electronic communication with the processor, and instructions stored in the memory. The instructions may be operable, when executed by the processor, to cause the apparatus to identify a radio frame structure that includes an HE signal field and an HE data field for communication, generate the HE signal field using a random bit sequence as padding bits for an OFDM symbol, and transmit a radio frame with the HE signal field that includes the random bit sequence as padding bits.

A non-transitory computer readable medium for wireless communication is described. The non-transitory computer-readable medium may include instructions operable to identify a radio frame structure that includes an HE signal field and an HE data field for communication, generate the HE signal field using a random bit sequence as padding bits for an OFDM symbol, and transmit a radio frame with the HE signal field that includes the random bit sequence as padding bits.

Some examples of the method, apparatus, or non-transitory computer-readable medium described above may further include processes, features, means, or instructions for identifying a PAPR condition, wherein the HE signal field is generated using the random bit sequence based at least in part on the PAPR condition.

Some examples of the method, apparatus, or non-transitory computer-readable medium described above may further include processes, features, means, or instructions for determining that the HE signal field includes a number of consecutive bits with a same value, wherein the PAPR condition is identified based at least in part on the number of consecutive bits exceeding a threshold.

In some examples of the method, apparatus, or non-transitory computer-readable medium described above, the consecutive bits with the same value includes bits from a plurality of OFDM symbols. Some examples of the method, apparatus, or non-transitory computer-readable medium described above may further include processes, features, means, or instructions for identifying a modulation and coding scheme (MCS) for the radio frame, wherein the PAPR condition is identified based at least in part on the MCS.

In some examples of the method, apparatus, or non-transitory computer-readable medium described above, the radio frame comprises at least one of an HE signaling field, an HE preamble, or an HE data field. In some examples of the method, apparatus, or non-transitory computer-readable medium described above, the HE signal field comprises at least one of an HE preamble, a short training field (L-STF), a long training field (L-LTF), a signal length (L-SIG), a repeated L-SIG, an HE signal A (SIG-A) field or an HE signal B (SIG-B) field.

In some examples of the method, apparatus, or non-transitory computer-readable medium described above, the HE signal field comprises at least one of a common field, a user specific field, a downlink/uplink (DL/UL) bit, a format bit, a basic service set (BSS) color field, a spatial reuse field, a transmission opportunity (TxOP) field, a bandwidth field, an MCS field, a cyclic prefix (CP) and long training field (LTF) size field, a coding field, a number of space-time streams field, a space-time block coding (STBC) field, a transmission beamforming (TxBF) field, a dual carrier modulation (DCM) field, a packet extension field, a beam change field, a Doppler field, a cyclic redundancy check (CRC) field, a tail field, a SIG-B MCS field, a SIG-B DCM field, a SIG-B number of symbols field, a SIG-B compression mode field, a number of HE-LTF symbols field, a low density parity check (LDPC) extra symbol, a station identification (STAID), a spatial configuration field, a tail bit, one or more padding bits, or any combination thereof.

A method of wireless communication is described. The method may include identifying a radio frame structure that includes an HE signal field and an HE data field for communication, reversing a binary value of each bit in a set of bits of the HE signal field, and transmitting a radio frame with the HE signal field that includes each bit in the set of bits having the reversed binary value.

An apparatus for wireless communication is described. The apparatus may include means for identifying a radio frame structure that includes an HE signal field and an HE data field for communication, means for reversing a binary value of each bit in a set of bits of the HE signal field, and means for transmitting a radio frame with the HE signal field that includes each bit in the set of bits having the reversed binary value.

Another apparatus for wireless communication is described. The apparatus may include a processor, memory in electronic communication with the processor, and instructions stored in the memory. The instructions may be operable, when executed by the processor, to cause the apparatus to identify a radio frame structure that includes an HE signal field and an HE data field for communication, reverse a binary value of each bit in a set of bits of the HE signal field, and transmit a radio frame with the HE signal field that includes each bit in the set of bits having the reversed binary value.

A non-transitory computer readable medium for wireless communication is described. The non-transitory computer-readable medium may include instructions operable to identify a radio frame structure that includes an HE signal field and an HE data field for communication, reverse a binary value of each bit in a set of bits of the HE signal field, and transmit a radio frame with the HE signal field that includes each bit in the set of bits having the reversed binary value.

Some examples of the method, apparatus, or non-transitory computer-readable medium described above may further include processes, features, means, or instructions for identifying a PAPR condition, wherein the binary value of each bit in the set of bits is reversed based at least in part on the PAPR condition.

In some examples of the method, apparatus, or non-transitory computer-readable medium described above, the set of bits of the HE signal field comprises consecutive bits of the HE signal field. Some examples of the method, apparatus, or non-transitory computer-readable medium described above may further include processes, features, means, or instructions for reversing the binary value of each bit in the set of bits comprises setting one or more zeros to ones and setting one or more ones to zeros.

In some examples of the method, apparatus, or non-transitory computer-readable medium described above, the set of bits of the HE signal field comprises a STAID. In some examples of the method, apparatus, or non-transitory computer-readable medium described above, the STAID comprises a broadcast resource unit (RU). In some examples of the method, apparatus, or non-transitory computer-readable medium described above, the set of bits of the HE signal field comprises an MCS field. In some examples, at least a portion of the signal field is selectively encoded.

A method of wireless communication is described. The method may include identifying a radio frame structure that includes an HE signal field and an HE data field for communication, scrambling a set of bits of the HE signal field, and transmitting a radio frame with the HE signal field that includes the scrambled set of bits of the HE signal field.

An apparatus for wireless communication is described. The apparatus may include means for identifying a radio frame structure that includes an HE signal field and an HE data field for communication, means for scrambling a set of bits of the HE signal field, and means for transmitting a radio frame with the HE signal field that includes the scrambled set of bits of the HE signal field.

Another apparatus for wireless communication is described. The apparatus may include a processor, memory in electronic communication with the processor, and instructions stored in the memory. The instructions may be operable, when executed by the processor, to cause the apparatus to identify a radio frame structure that includes an HE signal field and an HE data field for communication, scramble a set of bits of the HE signal field, and transmit a radio frame with the HE signal field that includes the scrambled set of bits of the HE signal field.

A non-transitory computer readable medium for wireless communication is described. The non-transitory computer-readable medium may include instructions operable to identify a radio frame structure that includes an HE signal field and an HE data field for communication, scramble a set of bits of the HE signal field, and transmit a radio frame with the HE signal field that includes the scrambled set of bits of the HE signal field.

In some examples of the method, apparatus, or non-transitory computer-readable medium described above, scrambling the set of bits of the HE signal field comprises: applying an XOR function to the set of bits of the HE signal field and a scrambling code. In some examples of the method, apparatus, or non-transitory computer-readable medium described above, the set of bits are scrambled based at least in part on an MCS of the HE signal field. In some examples of the method, apparatus, or non-transitory computer-readable medium described above, the set of bits are scrambled using a predetermined seed or a pseudorandom nonzero seed.

Some examples of the method, apparatus, or non-transitory computer-readable medium described above may further include processes, features, means, or instructions for receiving signaling that indicates the pseudorandom nonzero seed. In some examples of the method, apparatus, or non-transitory computer-readable medium described above, the set of bits are scrambled using a scrambling code selected to reduce a PAPR. In some examples, at least a portion of the signal field is selectively encoded.

A method of wireless communication is described. The method may include identifying a radio frame structure that includes an HE signal field and an HE data field for communication, applying a phase rotation to a set of symbols of the HE signal field, and transmitting a radio frame with the HE signal field that includes the set of symbols having the phase rotation.

An apparatus for wireless communication is described. The apparatus may include means for identifying a radio frame structure that includes an HE signal field and an HE data field for communication, means for applying a phase rotation to a set of symbols of the HE signal field, and means for transmitting a radio frame with the HE signal field that includes the set of symbols having the phase rotation.

Another apparatus for wireless communication is described. The apparatus may include a processor, memory in electronic communication with the processor, and instructions stored in the memory. The instructions may be operable, when executed by the processor, to cause the apparatus to identify a radio frame structure that includes an HE signal field and an HE data field for communication, apply a phase rotation to a set of symbols of the HE signal field, and transmit a radio frame with the HE signal field that includes the set of symbols having the phase rotation.

A non-transitory computer readable medium for wireless communication is described. The non-transitory computer-readable medium may include instructions operable to identify a radio frame structure that includes an HE signal field and an HE data field for communication, apply a phase rotation to a set of symbols of the HE signal field, and transmit a radio frame with the HE signal field that includes the set of symbols having the phase rotation.

In some examples of the method, apparatus, or non-transitory computer-readable medium described above, the phase rotation applied to the set of symbols of the HE signal field is applied on a set of tones after quadrature amplitude modulation (QAM) mapping. Some examples of the method, apparatus, or non-transitory computer-readable medium described above may further include processes, features, means, or instructions for identifying a plurality of frequency regions, wherein the phase rotation is applied to each frequency region of the plurality. In some examples, at least a portion of the signal field is selectively encoded.

Some examples of the method, apparatus, and non-transitory computer-readable medium described above may further include processes, features, means, or instructions for dividing the HE signal field into one or more segments. Some examples of the method, apparatus, and non-transitory computer-readable medium described above may further include processes, features, means, or instructions for applying the phase rotation to each of the one or more segments.

In some examples of the method, apparatus, and non-transitory computer-readable medium described above, the HE signal field comprises 56 tones, and wherein the 56 tones include 52 data tones.

In some examples of the method, apparatus, and non-transitory computer-readable medium described above, the phase rotation for every kth data tone of the HE signal field comprises: this here equation.

In some examples of the method, apparatus, and non-transitory computer-readable medium described above, the HE signal field comprises an HE SIG-A field or an HE SIG-B field.

In some examples of the method, apparatus, and non-transitory computer-readable medium described above, the HE signal field comprises a 20 MHz channel.

In some examples of the method, apparatus, and non-transitory computer-readable medium described above, the phase rotation comprises a DCM BPSK bit mapping.

A method of wireless communication is described. The method may include receiving a radio frame that includes an HE signal field and an HE data field, identifying a random bit sequence used as padding bits of an OFDM symbol in the HE signal field, and interpreting the HE signal field based at least in part on identifying the random bit sequence used as the padding bits.

An apparatus for wireless communication is described. The apparatus may include means for receiving a radio frame that includes an HE signal field and an HE data field, means for identifying a random bit sequence used as padding bits of an OFDM symbol in the HE signal field, and means for interpreting the HE signal field based at least in part on identifying the random bit sequence used as the padding bits.

Another apparatus for wireless communication is described. The apparatus may include a processor, memory in electronic communication with the processor, and instructions stored in the memory. The instructions may be operable, when executed by the processor, to cause the apparatus to receive a radio frame that includes an HE signal field and an HE data field, identify a random bit sequence used as padding bits of an OFDM symbol in the HE signal field, and interpret the HE signal field based at least in part on identifying the random bit sequence used as the padding bits.

A non-transitory computer readable medium for wireless communication is described. The non-transitory computer-readable medium may include instructions operable to receive a radio frame that includes an HE signal field and an HE data field, identify a random bit sequence used as padding bits of an OFDM symbol in the HE signal field, and interpret the HE signal field based at least in part on identifying the random bit sequence used as the padding bits.

Some examples of the method, apparatus, or non-transitory computer-readable medium described above may further include processes, features, means, or instructions for identifying a PAPR condition, wherein the random bit sequence used as padding bits is identified based at least in part on the PAPR condition. Some examples of the method, apparatus, or non-transitory computer-readable medium described above may further include processes, features, means, or instructions for identifying an MCS in the HE signal field, wherein the PAPR condition is identified based at least in part on the MCS.

A method of wireless communication is described. The method may include receiving a radio frame that includes an HE signal field and an HE data field, determining that a binary value of each bit in a set of bits of the HE signal field is reversed from an intended value, and interpreting the HE signal field according to the intended value.

An apparatus for wireless communication is described. The apparatus may include means for receiving a radio frame that includes an HE signal field and an HE data field, means for determining that a binary value of each bit in a set of bits of the HE signal field is reversed from an intended value, and means for interpreting the HE signal field according to the intended value.

Another apparatus for wireless communication is described. The apparatus may include a processor, memory in electronic communication with the processor, and instructions stored in the memory. The instructions may be operable, when executed by the processor, to cause the apparatus to receive a radio frame that includes an HE signal field and an HE data field, determine that a binary value of each bit in a set of bits of the HE signal field is reversed from an intended value, and interpret the HE signal field according to the intended value.

A non-transitory computer readable medium for wireless communication is described. The non-transitory computer-readable medium may include instructions operable to receive a radio frame that includes an HE signal field and an HE data field, determine that a binary value of each bit in a set of bits of the HE signal field is reversed from an intended value, and interpret the HE signal field according to the intended value.

Some examples of the method, apparatus, or non-transitory computer-readable medium described above may further include processes, features, means, or instructions for identifying a PAPR condition, wherein the determination that the binary value of each bit in the set of bits of the HE signal field is reversed from the intended value is based at least in part on the PAPR condition.

In some examples of the method, apparatus, or non-transitory computer-readable medium described above, the set of bits of the HE signal field comprises a STAID. In some examples of the method, apparatus, or non-transitory computer-readable medium described above, the STAID comprises a broadcast RU. In some examples of the method, apparatus, or non-transitory computer-readable medium described above, the set of bits of the HE signal field comprises an MCS field.

A method of wireless communication is described. The method may include receiving a radio frame that includes an HE signal field and an HE data field, determining that a set of bits of the HE signal field is scrambled, and interpreting the HE signal field based at least in part on the determination that the set of bits of the HE signal field is scrambled.

An apparatus for wireless communication is described. The apparatus may include means for receiving a radio frame that includes an HE signal field and an HE data field, means for determining that a set of bits of the HE signal field is scrambled, and means for interpreting the HE signal field based at least in part on the determination that the set of bits of the HE signal field is scrambled.

Another apparatus for wireless communication is described. The apparatus may include a processor, memory in electronic communication with the processor, and instructions stored in the memory. The instructions may be operable, when executed by the processor, to cause the apparatus to receive a radio frame that includes an HE signal field and an HE data field, determine that a set of bits of the HE signal field is scrambled, and interpret the HE signal field based at least in part on the determination that the set of bits of the HE signal field is scrambled.

A non-transitory computer readable medium for wireless communication is described. The non-transitory computer-readable medium may include instructions operable to receive a radio frame that includes an HE signal field and an HE data field, determine that a set of bits of the HE signal field is scrambled, and interpret the HE signal field based at least in part on the determination that the set of bits of the HE signal field is scrambled.

In some examples of the method, apparatus, or non-transitory computer-readable medium described above, the HE signal field is interpreted based at least in part on an MCS of the HE signal field. In some examples of the method, apparatus, or non-transitory computer-readable medium described above, interpreting the HE signal field comprises: descrambling the scrambled bits comprises using a descrambler with a predetermined seed or a pseudorandom nonzero seed on the scrambled bits. Some examples of the method, apparatus, or non-transitory computer-readable medium described above may further include processes, features, means, or instructions for transmitting signaling that indicates the pseudorandom nonzero seed.

A method of wireless communication is described. The method may include receiving a radio frame that includes an HE signal field and an HE data field, determining a phase rotation of a set of symbols of the HE signal field of the radio frame, and demodulating the set of symbols of the HE signal field based at least in part on the identified phase rotation.

An apparatus for wireless communication is described. The apparatus may include means for receiving a radio frame that includes an HE signal field and an HE data field, means for determining a phase rotation of a set of symbols of the HE signal field of the radio frame, and means for demodulating the set of symbols of the HE signal field based at least in part on the identified phase rotation.

Another apparatus for wireless communication is described. The apparatus may include a processor, memory in electronic communication with the processor, and instructions stored in the memory. The instructions may be operable, when executed by the processor, to cause the apparatus to receive a radio frame that includes an HE signal field and an HE data field, determine a phase rotation of a set of symbols of the HE signal field of the radio frame, and demodulate the set of symbols of the HE signal field based at least in part on the identified phase rotation.

A non-transitory computer readable medium for wireless communication is described. The non-transitory computer-readable medium may include instructions operable to receive a radio frame that includes an HE signal field and an HE data field, determine a phase rotation of a set of symbols of the HE signal field of the radio frame, and demodulate the set of symbols of the HE signal field based at least in part on the identified phase rotation.

Some examples of the method, apparatus, or non-transitory computer-readable medium described above may further include processes, features, means, or instructions for adjusting for the phase rotation of the set of symbols of the HE signal field before demodulating the set of symbols according to a QAM mapping. Some examples of the method, apparatus, or non-transitory computer-readable medium described above may further include processes, features, means, or instructions for identifying a plurality of frequency regions, wherein the phase rotation is determined for each frequency region of the plurality.

DETAILED DESCRIPTION

High efficiency (HE) transmissions may be made with signal fields configured to reduce undesirable effects, such as high peak-to-average power ratios (PAPR). For example, some wireless devices may communicate using HE transmissions (e.g., using multiple spatial streams under multiple-input, multiple-output (MIMO) operation). In some cases, HE transmissions may have a high PAPR if a large number of consecutive bits have the same value (i.e., either a series of consecutive 1's or 0's). That is, a high PAPR may be associated with transmission of a large number of consecutive bits with the same value in one or more fields of the radio frame (e.g., a region or field within an HE signal field) or a modulation and coding scheme (MCS) used for one or more fields of the radio frame.

In some cases, random bits may be used to resolve zero bit or one bit dominant symbols (e.g., due to a sequence of zeroes used for symbol padding). That is, random bits may be used as padding bits such that a consecutive sequence of all ones or all zeros may be avoided for padding. Random padding bits may reduce PAPR in symbols that employ padding. In some cases, bits in some fields of an HE signal A (SIG-A) and/or HE signal B (SIG-B) may be reversed to improve PAPR conditions. That is, the impact of fields that may be more responsible for high PAPR (e.g., station identification (STAID) for broadcast RUs, per STA MCS, etc.) may be reduced if bits in the fields are reversed.

In some cases, bit scrambling may result in HE SIG-A and/or HE SIG-B being less prone to high PAPR as the process may make the value of the bits more random. The bits may be scrambled using a scrambler (e.g., a PAPR reducing scrambling code) with a predetermined seed (e.g., a WiFi scrambler) or a pseudorandom seed. Different PAPR reducing scrambling codes may be used for different MCSs of the SIG-A and/or SIG-B. In some cases, a scrambling method may be used in addition to random padding methods described above. In some cases, phase rotation may mitigate high PAPR scenarios. That is, phase rotation on tones (e.g., data tones) after quadrature amplitude modulation (QAM) mapping may reduce PAPR.

Aspects of the disclosure introduced above are described herein in the context of a wireless communication system. Example process flows for PAPR reduction in HE signal fields are then described. Aspects of the disclosure are further illustrated by and described with reference to apparatus diagrams, system diagrams, and flowcharts that relate to title of the application.

Figure 1:
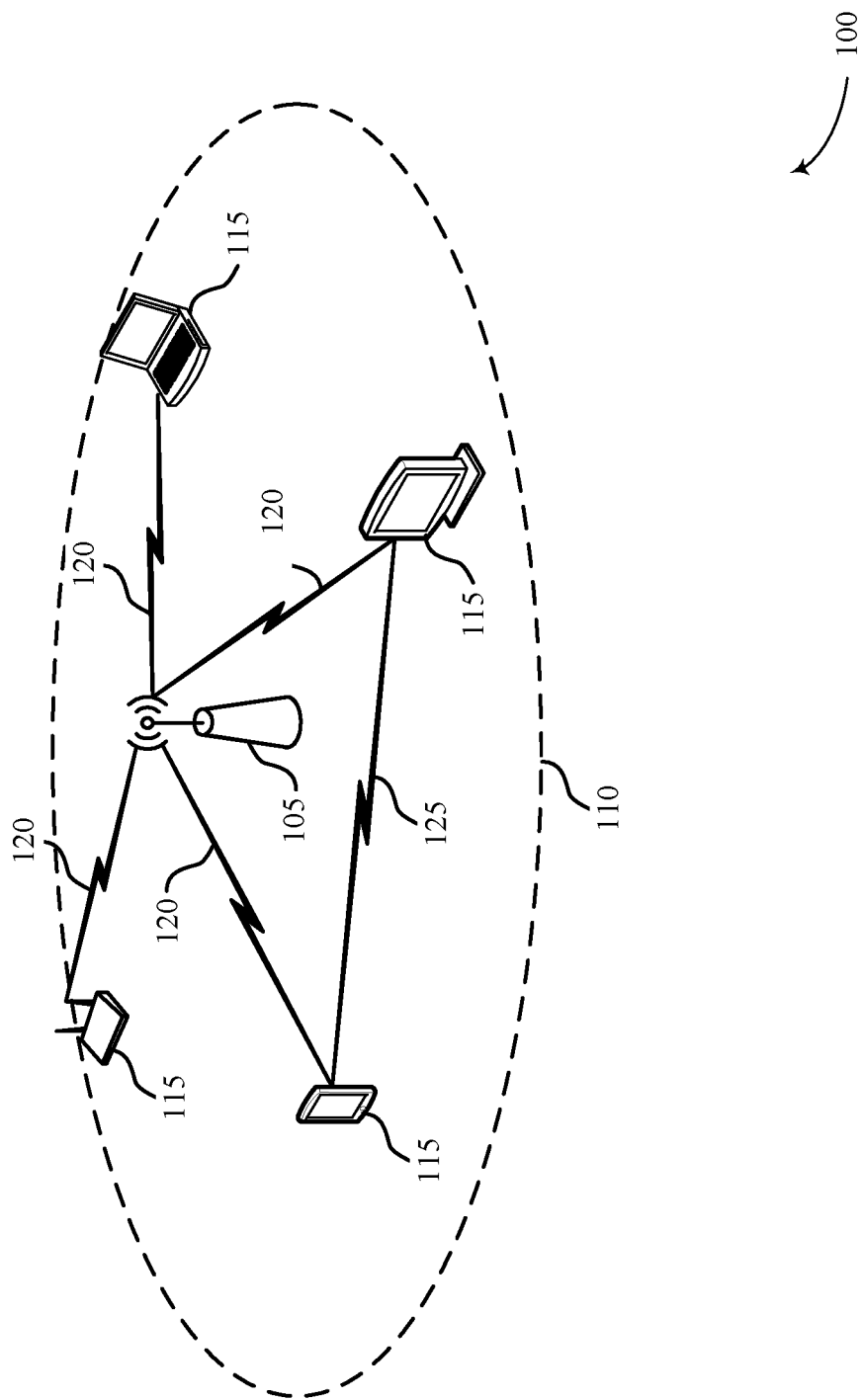
FIGS. 1 and 2 illustrate examples of systems for wireless communication that supports peak-to-average power ratio (PAPR) reduction in high efficiency (HE) signal fields in accordance with aspects of the present disclosure.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN 100.

Transmission in a WLAN may be based on digital information that is transformed into a wireless signal using a modulation process. Modulation is the process of representing a digital signal by modifying the properties of a periodic waveform (e.g., frequency, amplitude and phase). Demodulation takes a modified waveform and generates a digital signal. A modulated waveform may be divided into time units known as symbols. Each symbol may be modulated separately. In a wireless communication system that uses narrow frequency subcarriers to transmit distinct symbols, the modulation is accomplished by varying the phase and amplitude of each symbol. For example, a binary phase shift keying (BPSK) modulation scheme conveys information by alternating between waveforms that are transmitted with no phase offset or with a 180° offset (i.e., each symbol conveys a single bit of information).

In a QAM scheme, two carrier signals (known as the in-phase component, I, and the quadrature component, Q) may be transmitted with a phase offset of 90°, and each signal may be transmitted with specific amplitude selected from a finite set. The number of amplitude bins determines the number of bits that are conveyed by each symbol. For example, in a 16 QAM scheme, each carrier signal may have one of four amplitudes (e.g., −3, −1, 1, 3), which results in 16 possible combinations (i.e., 4 bits). The various possible combinations may be represented in a graph known as a constellation map, where the amplitude of the I component is represented on the horizontal axis and the Q component is represented on the vertical axis. Modulation techniques may be represented in a MCS. In some cases, the MCS used for a wireless transmission may also affect the PAPR of the transmission.

Transmissions to or from STAs 115 and APs 105 oftentimes include control information within a header that is transmitted prior to data transmissions. The information provided in a header is used by a device to decode the subsequent data. HE WLAN preambles can be used to schedule multiple devices, such as STAs 115, for single-user simultaneous transmission (e.g., single-user orthogonal frequency division multiple access (SU-OFDMA)) and/or MU-MIMO transmissions (e.g., multiple input multiple output MU-MIMO). In one example, an HE WLAN signaling field is used to signal a resource allocation pattern to multiple receiving STAs 115.

The HE WLAN signaling field may include a common user field that is decodable by multiple STAs 115, the common user field including a resource allocation field. The resource allocation field indicates resource unit distributions to the multiple STAs 115 and indicates which resource units in a resource unit distribution correspond to MU-MIMO transmissions and which resource units correspond to OFDMA single-user transmissions. The HE WLAN signaling field also includes, subsequent to the common user field, dedicated user fields that are assigned to certain STAs 115. The order in which the dedicated user fields are generated corresponds to the allocated resource units (e.g., the first dedicated user field corresponds to the first allocated resource unit). The HE WLAN signaling field is transmitted with a WLAN preamble to the multiple STAs 115.

An HE SIG-A and/or HE-SIG-B field may include various control information, including rate information for decoding a payload, information to specify an MCS, coding information, spatial multiplexing information, or other information that may be used by a receiver to decode data sent in the radio frame (e.g., a WLAN frame). The HE SIG-B field may also include resource allocation information so that each STA 115 scheduled to receive a transmission has information concerning which portions of the data to decode (e.g., which resource unit (RU) or RUs are meant to be decoded by that particular STA 115). In some cases an HE SIG-A may refer to a SIG-A field and an HE SIG-B may refer to a SIG-B field, and visa versa. Further, the radio frame may include both HE fields and non-HE fields. That is, the radio frame may include both an HE SIG-B and a non-HE SIG-B field (e.g., a SIG-B field), in addition to various other HE and non-HE fields.

An HE SIG-B may contain a variable number of symbols. Further, padding bits may be used to ensure the HE SIG-B field has an integer number of symbols. The padding bits may be added after user-specific information in the SIG-B and/or SIG-A. SIG-B and/or SIG-A frames may be prone to large PAPR. Scenarios of HE SIG-B having large PAPR may include all zero bit padding in HE SIG-B (e.g., high PAPR on the last symbol due to large number of consecutive ones or zeros used for padding bits), one orthogonal frequency division multiplexing (OFDM) symbol with several zeros or ones in the content of the SIG-B, broadcast RUs resulting in many zeros in the middle of the SIG-B, etc. That is, high PAPRs may exist when symbols containing information bits are composed of a large number of zero bits or a large number of one bits. High PAPR may also arise in scenarios where similar bit patterns exist (e.g., sequential STAID fields within multi-user fields directed to STAs 115 with similar association identifications (AIDs)). In some cases, the same issues may occur with an HE SIG-A.

Certain fields and/or bits of a SIG-B and/or SIG-A may have an increased impact on PAPR. That is, certain fields may be associated with repeated information bits that may cause high PAPR. The number of space-time streams field, the coding field (e.g., bit), the beamforming field, the MCS field, the dual carrier modulation (DCM) field, etc. may have similar configurations among multiple STAs. For example, in enterprise deployments, link quality is managed and therefore the range of MCSs is limited (e.g., similar values among STAs). Further, a STAID may be sequentially assigned and may result in only small differences (e.g., a few bits) between STAIDs. So as described herein, high PAPR conditions may be mitigated by proactively limiting HE transmissions with fields that have consecutive bits of the same binary value.

Figure 2:
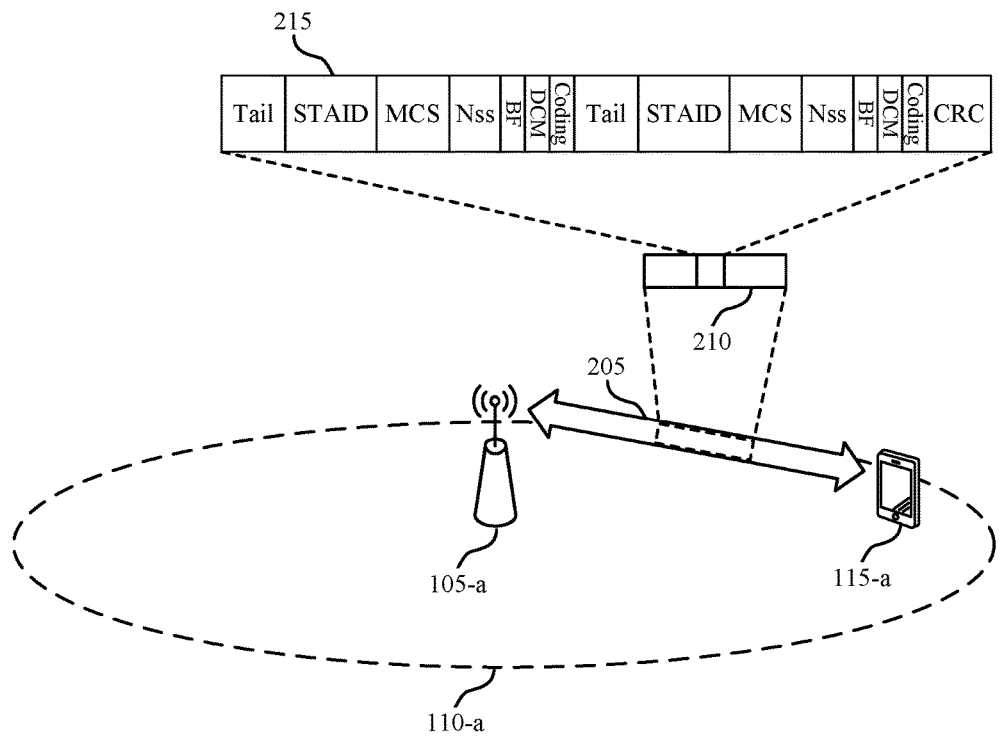

FIG. 2 illustrates an example of a WLAN 200 (also known as a Wi-Fi network) that supports PAPR reduction in HE signal fields. The WLAN 200 may include an AP 105-*a* and a STA 115-*a* in a coverage area 110-*a*, and may illustrate a transmission 205 containing a consecutive bit region 210. In some cases, WLAN 200 may represent aspects of techniques performed by a STA 115 or AP 105 as described with reference to FIG. 1. WLAN 200 may represent an example of a wireless communication system that may have a high PAPR (i.e., caused by the number of consecutive bits with the same value in consecutive bit region 210).

By way of example, consecutive bit region 210 may be a portion of a radio frame that includes fields that support HE or non-HE communications, or both—e.g., region 210 may include signal or data fields configured according to various versions of a wireless communications standard. Region 210 may include a non-HE preamble, an HE signal field, and an HE data field, such as HE signal field 215. HE signal field 215 may include an HE SIG-A field and/or an HE SIG-B field. According to the example of FIG. 2, HE signal field 215 may include various fields, such as tail fields, STAID fields, an MCS fields, and the like. Alternatively, HE signal field 215 may include other fields or combinations of fields in different examples. HE signal field 215 may also include padding bits in some cases. Region 210 may include padding bits in some cases. The various fields of region 210, including the fields of HE signal field 215 or padding bits, or both, may have consecutive bits with the same value (i.e., zero or one) which may give rise a high PAPR condition.

In some cases, random bits may be used to mitigate the impact consecutive zero bit or one bit fields (e.g., consecutive bit region 210). For instance, random bits may be used as padding bits such that neither all ones nor all zeros are used for padding. Random padding bits may reduce PAPR in symbols that employ padding. As padding bits may not convey useful information, a SIG-B and/or SIG-A may be interpreted after discarding the padding bits, and may be interpreted (e.g., by STA 115-*a*) with increased success due to improved PAPR conditions.

Bits in some fields of the SIG-A and/or SIG-B may be reversed to improve PAPR conditions. The impact of fields that are more responsible for high PAPR (e.g., STAID for broadcast RUs, per STA MCS, etc.) may be mitigated if bits in the fields are reversed. For example, bits with a binary value of zero may reversed to have a binary value of one, yet the reversed bits may be interpreted to convey the same information as though they were not reversed.

Scrambling bits (e.g., information bits) may result in SIG-A and/or SIG-B being less prone to high PAPR as the process may make the value of the bits more random. The bits of some fields (e.g., HE signal field 215) may be scrambled using a scrambler (e.g., a PAPR reducing scrambling code) with a predetermined seed (e.g., WiFi scrambler)

or a non-zero pseudorandom seed. An unknown or pseudorandom seed may be signaled with additional bits, whereas a fixed seed may not use additional seed signaling. As an example, an exclusive or (XOR) gate (e.g., XOR function) may be used on the PAPR reducing scrambling code and the bits of the SIG-A and/or SIG-B. The PAPR reducing scrambling code search may be performed before the SIG-A and/or SIG-B fields' content and order is finalized. Different PAPR reducing scrambling codes may be used for different MCSs of the SIG-A and/or SIG-B. In some cases, a scrambling method may be used in addition to random padding methods described above. For example, an IEEE 802.11a scrambler with a fixed seed may be used in addition to random padding bits.

Additionally or alternatively, phase rotation may be used to mitigate high PAPR. That is, phase rotation on tones (e.g., data tones) after modulation (e.g., QAM mapping) may reduce PAPR. For example, each channel (e.g., 20 MHz channel or 56 tones) in a SIG-A and/or SIG-B may be divided into segments. In this example, phase rotations may be applied on each 20 MHz channel segment (e.g., over 56 tones). That is, each 20 MHz HE SIG-A and/or SIG-B frequency segment may have 56 usable tones, 52 of which are data tones. For every kth data tone in the 20 MHz channel for the SIG field, a phase rotation pattern may be defined as, $$\begin{cases} 1 & \text{for } 0 \leq k < 26 \\ (-1)^k & \text{for } 26 \leq k < 52 \end{cases} \quad (1)$$

Various combinations of segmentation and application of phase rotation may yield different results on the 56 tones. For example, a solution may include using four segments, and applying IEEE 802.11ac 80 MHz-like phase rotation (e.g., [1 −1 −1 −1]) for PAPR reduction. For different HE SIG-B channel 1 and channel 2, phase rotation may be assumed (e.g., legacy 20 MHz phase rotation), and therefore similar bits between HE SIG-B channels may not create PAPR issues. In some cases, phase rotation after QAM mapping can be skipped (e.g., for DCM and MCS0, since the same rotation (as in Eq. 1) is applied in the DCM BPSK bit mapping). In some cases, phase rotation may be applied on a SIG-A and/or SIG-B regardless of the DCM indication.

In some cases, certain bits of the HE signal field (e.g., an HE SIG-A field) may be set according to a predetermined PAPR reduction configuration. That is, at least a portion of the signal field may be selectively encoded. For example, in a single user physical layer convergence protocol (PLCP) protocol data unit (PPDU) case, a reserved bit may be set to 1; an UL/DL field may be set to 0 for DL and to 1 for UL; a format filed may be set to 1 if a single user packet is indicated and 0 if a single user PPDU is used; a BSS color field may be set to all 1's; a spatial reuse field may be set to a non-zero value for a default non-reuse case; a coding field may be set to 01 for blind convolutional coding (BCC) and 10 or 11 for low-density parity coding (LDPC). An example of this type of encoding is shown in Table 1 below.

TABLE 1

Example HE SIG-A Field for an HE SU PPDU and Extended Range SU PPDU

| Field | Length (bits) | Description | Example Encoding for PAPR Reduction |
|---|---|---|---|
| Reserved | 1 | | Set to 1 |
| Format | 1 | Differentiate between an SU PPDU and a Trigger-based UL PPDU | 0: DL; 1: UL 1: SU; 0: triggered |
| DL/UL | 1 | Indicates whether the frame is UL or DL. The field is set to DL for TDLS. | 00: is invalid combination |
| BSS Color | 6 | Base station identifier. | Set to all "1"s instead of all "0"s for no color case |
| Spatial Reuse | Varies | Exact bits may vary, e.g., indication of CCA Level, Interference Level accepted, TX Power | Set to non-zero value for the default non reuse case |
| TXOP Duration | Varies | Indicates the remaining time in the current TXOP. | |
| Bandwidth | 2 | | |
| MCS | 4 | | |
| CP + LTF Size | 3 | | |
| Coding | 2 | | BCC: 01; LDPC: 10 or 11. |
| Nsts | 3 | | |
| STBC | 1 | | |
| TxBF | 1 | | |
| DCM | 1 | Dual carrier modulation indication | |
| Packet Extension | 3 | "a"-factor field of 2 bits and 1 disambiguation bit | |
| Beam Change | 1 | Indicate precoder change/no change between L-LTF and HE-LTF. | |
| Doppler | 1 | | |
| CRC | 4 | | |
| Tail | 6 | | |

In a multi-user PPDU case, a reserved bit may be set to 1; an UL/DL field may be set to 0 for DL and to 1 for UL; a spatial reuse field may be set to a non-zero value for a default non-reuse case; and a SIGB MCS field may be set based on the MCS. An example of this type of encoding is shown in Table 2 below.

TABLE 2

Example HE SIG-A Field for an HE MU PPDU

| Field | Length (bits) | Description | Example Encoding for PAPR Reduction |
|---|---|---|---|
| Reserved | 1 | | Set to 1 |
| DL/UL | 1 | | 0: DL; 1: UL |
| BSS Color | 6 | Base station identifier. | Set to all "1"s instead of all "0"s for no color case |
| Spatial Reuse | Varies | | Set to non-zero value for the default non reuse case |
| TXOP Duration | Varies | Indicates the remaining time in the current TXOP. | |
| Bandwidth | 3 | | |
| SIGB MCS | 3 | | MCS0, MCS1, MCS2, MCS3, MCS4, MCS5 Other MCS TBD |
| SIGB DCM | 1 | | |
| SIGB Number Of Symbols | 4 | Support approximate 16 users using MCS0 per BCC; When SIGB compression mode is enabled, the number of symbols maybe re-purposed to indicate the number of MU-MIMO users | |
| SIGB Compression Mode | ≥1 | Differentiates full bandwidth MU-MIMO from OFDMA MU PPDU. More compression modes TBD. | |
| Number of HE-LTF Symbols | 3 | Up to 8 LTF symbols may be possible | |
| CP + LTF Size | 3 | | |
| LPDC Extra Symbol | 1 | | |
| Packet Extension | 3 | | |
| Doppler | 1 | | |
| STBC | 1 | This bit indicates STBC for users in the payload and may not apply to SIGB | |
| CRC | 4 | | |
| Tail | 6 | | |

In the case of a trigger based PPDU, a reserved bit may be set to 1; a format field may be set to 0; and a spatial reuse field may be set to a non-zero value for a default non-reuse case. An example of this type of encoding is shown in Table 3 below.

TABLE 3

Example HE SIG-A Field for an HE Trigger-based PPDU

| Field | Length (bits) | Description | Example Encoding for PAPR Reduction |
|---|---|---|---|
| Reserved | 1 | | Set to 1 |
| Format | 1 | Differentiate between an SU PPDU and a Trigger-based UL PPDU | =0 |
| BSS Color | 6 | Base station identifier. | Set to all "1"s instead of all "0"s for no color case |
| Spatial Reuse | Varies | multiple SR fields (>=2) may be signalled, where each SR field may correspond to a different subband of the PPDU | Set to non-zero value for the default non reuse case |
| TXOP Duration | Varies | Indicates the remaining time in the current TXOP. | |
| Bandwidth | Varies | | |
| CRC | 4 | | |
| Tail | 6 | | |

Figure 3:
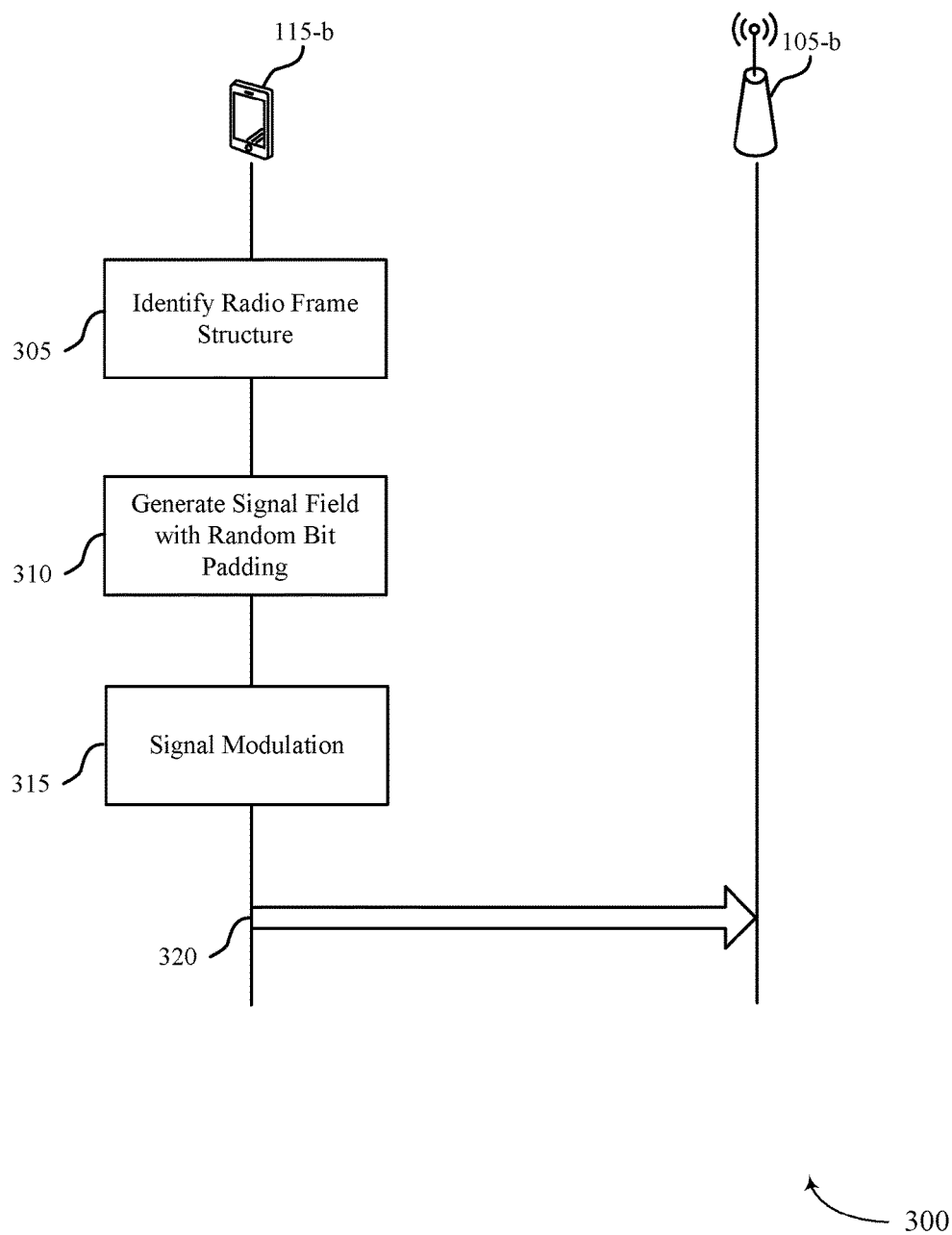
FIGS. 3 through 6 illustrate examples of process flows that supports PAPR reduction in HE signal fields in accordance with aspects of the present disclosure.

FIG. 3 illustrates an example of a process flow 300 for PAPR reduction in HE signal fields. In some cases, process flow 300 may represent aspects of techniques performed by a STA 115 or AP 105 as described with reference to FIG. 1. Process flow 300 depicts an example in which random bits are used for symbol padding to reduce PAPR. Although an example is illustrated in which a STA 115 performs operations to mitigate PAPR in an uplink transmission, an AP 105 or another wireless device may also utilize these techniques in preforming downlink or device-to-device (D2D) transmissions.

At 305, STA 105-b may identify a radio frame structure. The radio frame structure may include an HE signal field, an HE preamble, and an HE data field for shared radio frequency communications. In some cases, the HE signal field may include a short training field (L-STF), a long training field (L-LTF), a signal length (L-SIG), a repeated L-SIG, an HE SIG-A field or an HE SIG-B field.

At 310, STA 105-*b* may generate a random bit sequence as padding bits of an OFDM symbol for HE signal field generation. In some cases, the padding bits may be consecutive bits used for padding at the end of the OFDM symbol. The random bit sequence may be the length of padding (e.g., in bits) that results in an integer number of symbols within a field. The signal field may be generated using a random sequence for padding bits regardless of a whether a high PAPR condition is detected. But in some cases, the signal field generation may be based on a PAPR condition. For example, the PAPR condition may be based on a number of consecutive bits with the same value in a field of the radio frame or an identified MCS used for one or more fields of the radio frame (e.g., an MCS of the HE signal field).

At 315, STA 105-*b* may modulate a signal (e.g., contents of the radio frame) for transmission. At 320, STA 105-*b* may transmit a radio frame in a shared radio frequency spectrum band. The radio frame may include the HE signal field with the random bit sequence as padding bits. AP 105-*b* may thus receive the radio frame. AP 105-*b* may then identify a random bit sequence used as padding bits of an OFDM symbol in the HE signal field and interpret the HE signal field based on identifying the random bit sequence used as the padding bits.

Figure 4:
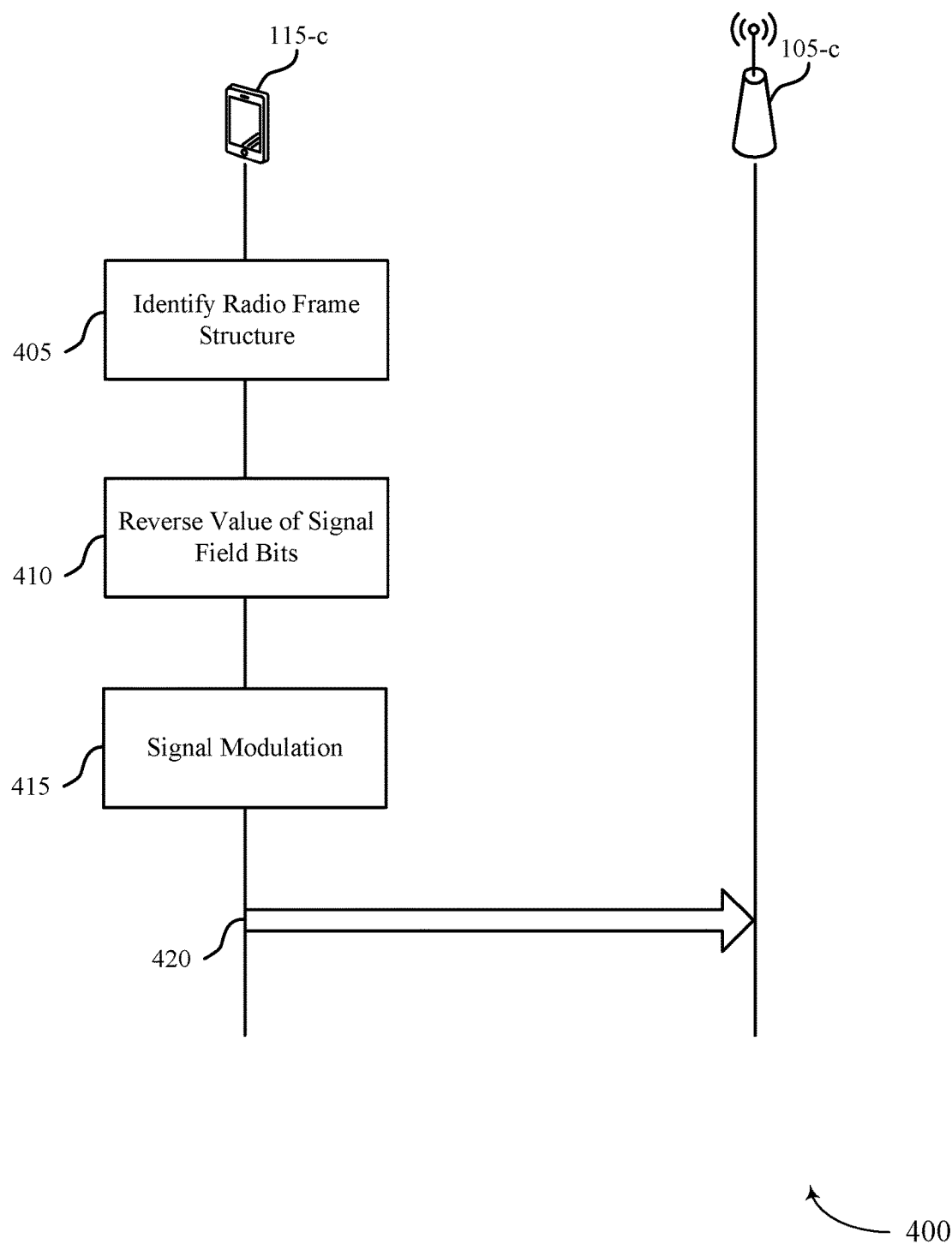

FIG. 4 illustrates an example of a process flow 400 for PAPR reduction in HE signal fields. In some cases, process flow 400 may represent aspects of techniques performed by a STA 115 or AP 105 as described with reference to FIG. 1. Process flow 400 depicts an example in which bits of a region within a radio frame are reversed to reduce PAPR. Although an example is illustrated in which a STA 115 performs operations to mitigate PAPR in an uplink transmission, an AP 105 or another wireless device may also utilize these techniques in preforming downlink or D2D transmissions.

At 405, STA 105-*c* may identify a radio frame structure. The radio frame structure may include an HE signal field, an HE preamble, and an HE data field for shared radio frequency communications. In some cases, the HE signal field may include an L-STF, L-LTF, an L-SIG, a repeated L-SIG, an HE SIG-A field or an HE SIG-B field.

At 410, STA 105-*c* may reverse a binary value of bits in the HE signal field. For example, reversing the binary value of bits in the HE signal field may include setting binary values of zero to one and setting binary values of one to zero. In some cases, the bits that are reversed may be consecutive bits. A STAID, MCS field, etc. are examples of regions within the HE signal field that may have bits reversed. In some cases, the reversing of bits within the HE signal field may be based on a PAPR condition. The PAPR condition may be based on a number of consecutive bits with the same value in a field of the radio frame or an identified MCS used for one or more fields of the radio frame (e.g., an MCS of the HE signal field).

At 415, STA 105-*c* may modulate a signal (e.g., contents of the radio frame) for transmission. At 420, STA 105-*c* may transmit a radio frame in a shared radio frequency spectrum band. The radio frame may include the HE signal field containing regions that include bits that have been reversed. AP 105-*c* may thus receive radio frame that includes an HE signal field and an HE data field. AP 105-*c* may determine that a binary value of each bit in a set of bits of the HE signal field is reversed from an intended value and interpret the HE signal field according to the intended value.

Figure 5:
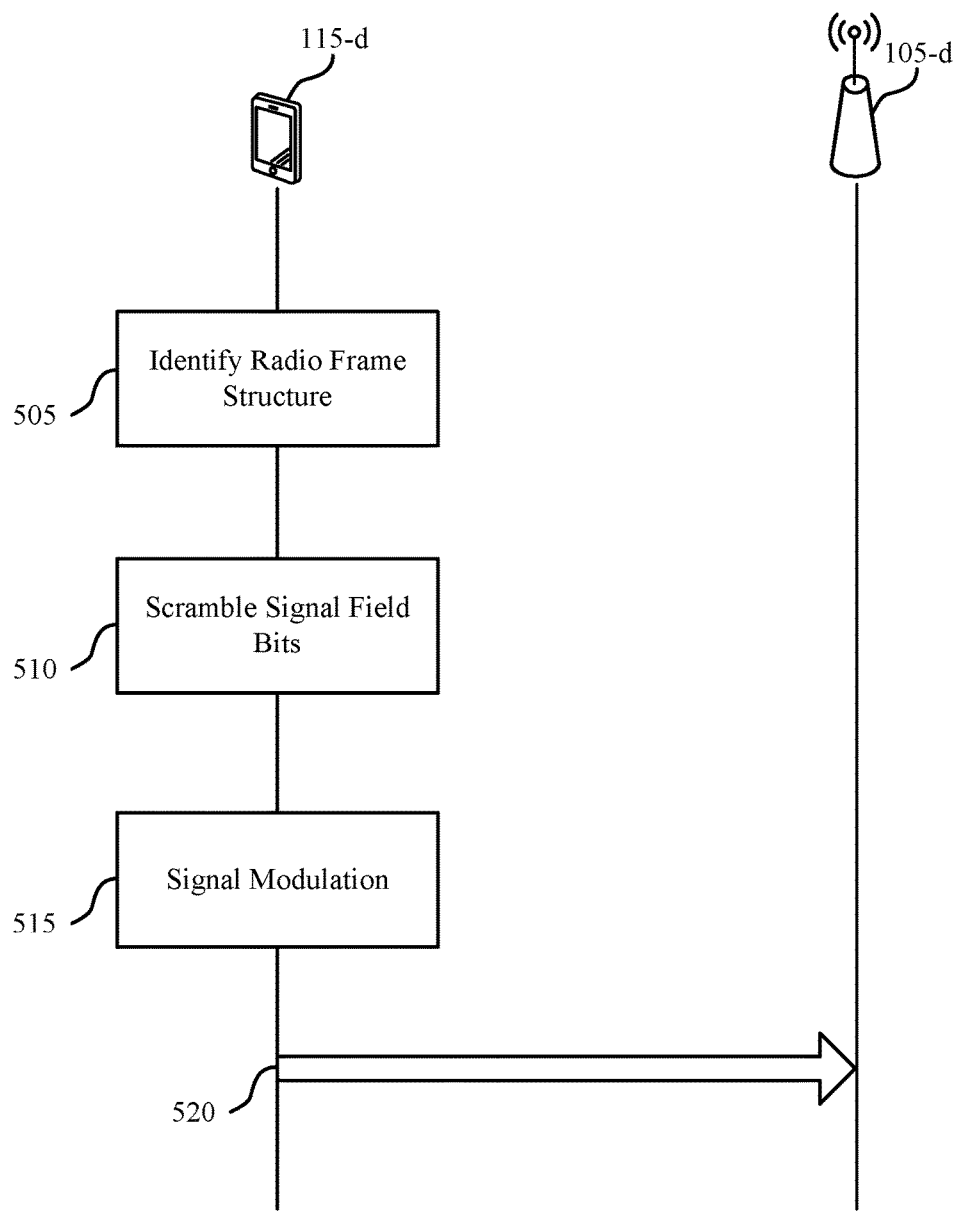

FIG. 5 illustrates an example of a process flow 500 for PAPR reduction in HE signal fields. In some cases, process flow 500 may represent aspects of techniques performed by a STA 115 or AP 105 as described with reference to FIG. 1. Process flow 500 depicts an example in which bits of a region within a radio frame are scrambled to reduce PAPR. Although an example is illustrated in which a STA 115 performs operations to mitigate PAPR in an uplink transmission, an AP 105 or another wireless device may also utilize these techniques in preforming downlink or D2D transmissions.

At 505, STA 105-*d* may identify a radio frame structure. The radio frame structure may include an HE signal field, an HE preamble, and an HE data field for shared radio frequency communications. In some cases, the HE signal field may include an L-STF, L-LTF, an L-SIG, a repeated L-SIG, an HE SIG-A field or an HE SIG-B field.

At 510, STA 105-*d* may scramble one or more bits in the HE signal field. In some cases, the scrambling of HE signal field bits (e.g., a selected scrambling code) may be based on a PAPR condition. The PAPR condition may be based on a number of consecutive bits with the same value in a field of the radio frame or an identified MCS used for one or more fields of the radio frame (e.g., the MCS of the HE signal field). For example, an XOR function may be applied to a selected scrambling code and a region of bits within the HE signal field. In some cases, the scrambler may have a predetermined or pseudorandom nonzero seed. Signaling may indicate a pseudorandom nonzero seed.

At 515, STA 105-*d* may modulate a signal (e.g., contents of the radio frame) for transmission. At step 520, STA 105-*d* may transmit the radio frame including the HE signal field containing regions that include scrambled bits. AP 105-*d* may receive the radio frame. AP 105-*d* may then determine that a set of bits of the HE signal field is scrambled and interpret the HE signal field based on the determination that the set of bits of the HE signal field is scrambled.

Figure 6:
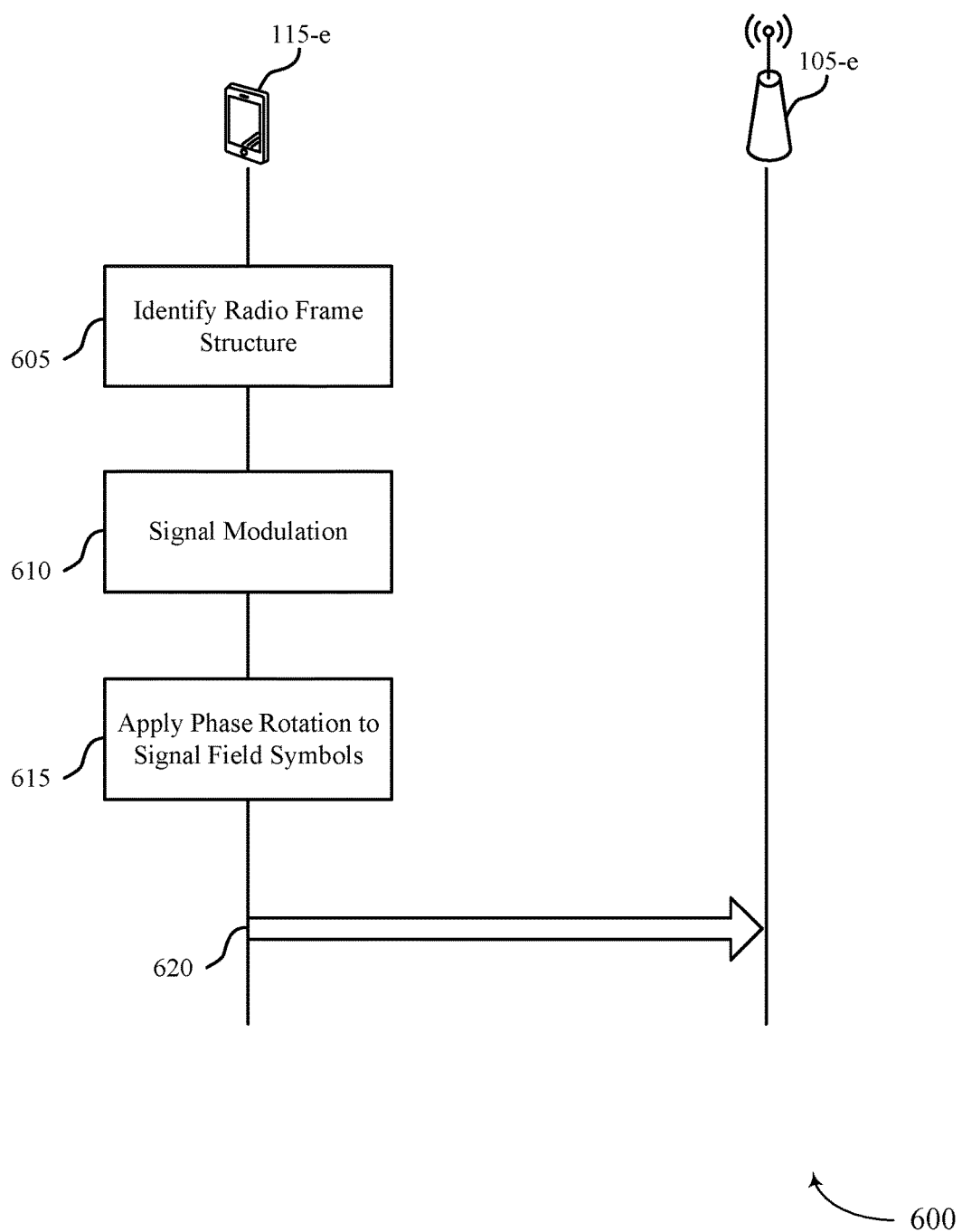

FIG. 6 illustrates an example of a process flow 600 for PAPR reduction in HE signal fields. In some cases, process flow 600 may represent aspects of techniques performed by a STA 115 or AP 105 as described with reference to FIG. 1. Process flow 600 depicts an example in which a phase rotation is applied to symbols of a region within a radio frame to reduce PAPR. Although an example is illustrated in which a STA 115 performs operations to mitigate PAPR in an uplink transmission, an AP 105 or another wireless device may also utilize these techniques in preforming downlink or D2D transmissions.

At 605, STA 105-*e* may identify a radio frame structure. The radio frame structure may include an HE signal field, an HE preamble, and an HE data field for shared radio frequency communications. In some cases, the HE signal field may include an L-STF, L-LTF, an L-SIG, a repeated L-SIG, an HE SIG-A field or an HE SIG-B field. At step 610, AP 105-*e* may modulate a signal (e.g., contents of the radio frame) for transmission.

At 615, STA 105-*e* may apply a phase rotation to a set of symbols of the HE signal field. For example, the phase rotation may be applied to a set of symbols of the HE signal field after QAM mapping. Further, a phase rotation may be applied to multiple frequency regions in the shared frequency spectrum band. In some cases, the phase rotation of HE signal field symbols may be based on a PAPR condition. The PAPR condition may be based on a number of consecutive bits with the same value in a field of the radio frame or an MCS used for one or more fields of the radio frame (e.g., an MCS of the HE signal field).

At 620, STA 105-*e* may transmit the radio frame including the HE signal field containing regions that include scrambled bits. AP 105-*e* may receive the radio frame. AP 105-*e* may then determine a phase rotation of a set of symbols of the HE signal field of the radio frame and demodulate the set of symbols of the HE signal field based at least in part on the determined phase rotation.

Figure 7:
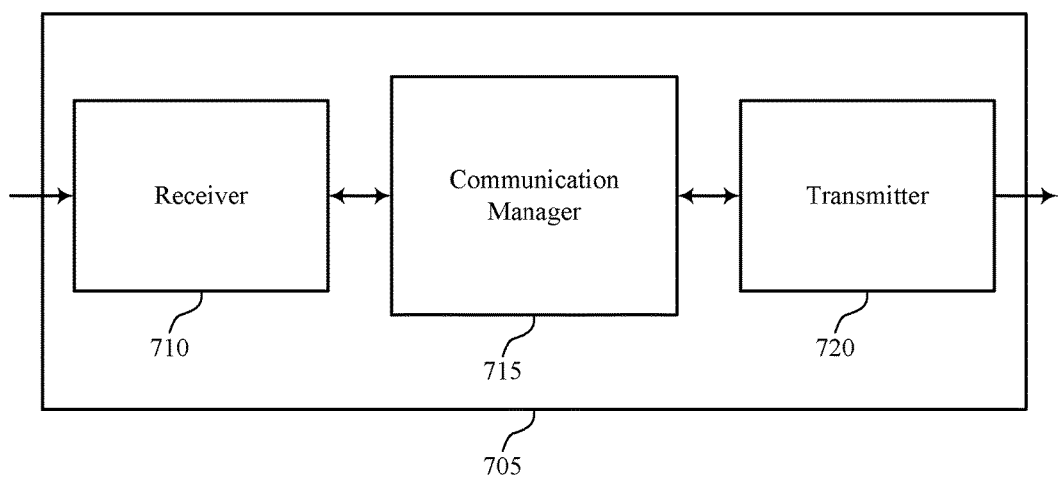
FIGS. 7 through 9 show block diagrams of a device that supports PAPR reduction in HE signal fields in accordance with aspects of the present disclosure.

FIG. 7 shows a block diagram 700 of a device 705 that supports PAPR reduction in HE signal fields in accordance with various aspects of the present disclosure. Device 705 may be an example of aspects of an AP 105 or STA 115 as described with reference to FIGS. 1 and 2. Wireless device 705 may include receiver 710, communication manager 715, and transmitter 720. Device 705 may also include a processor. Each of these components may be in communication with one another (e.g., via one or more buses).

Receiver 710 may receive information such as packets, user data, or control information associated with various information channels (e.g., control channels, data channels, and information related to PAPR reduction in HE signal fields, etc.). Information may be passed on to other components of the device. The receiver 710 may be an example of aspects of the transceiver 1040 described with reference to FIG. 10.

Receiver 710 may receive (e.g., in a shared radio frequency spectrum band) a radio frame that includes an HE signal field and an HE data field, and demodulate the set of symbols of the HE signal field based on the identified phase rotation.

Communication manager 715 may identify a radio frame structure that includes an HE signal field and an HE data field for communicating in a shared radio frequency spectrum band. Communication manager 715 may generate the HE signal field using a random bit sequence as padding bits for an OFDM symbol, reverse a binary value of each bit in a set of bits of the HE signal field, scramble a set of bits of the HE signal field, and/or apply a phase rotation to a set of symbols of the HE signal field.

Communication manager 715 may also identify a random bit sequence used as padding bits of an OFDM symbol in the HE signal field and interpret the HE signal field based on identifying the random bit sequence used as the padding bits, determine that a binary value of each bit in a set of bits of the HE signal field is reversed from an intended value and interpret the HE signal field according to the intended value, determine that a set of bits of the HE signal field is scrambled and interpret the HE signal field based on the determination that the set of bits of the HE signal field is scrambled, or determine a phase rotation of a set of symbols of the HE signal field of the radio frame. Communication manager 715 may be an example of aspects of the communication manager 1015 described with reference to FIG. 10.

Transmitter 720 may transmit signals generated by other components of the device. In some examples, the transmitter 720 may be collocated with a receiver 710 in a transceiver module. For example, the transmitter 720 may be an example of aspects of the transceiver 1040 described with reference to FIG. 10. The transmitter 720 may include a single antenna, or it may include a set of antennas.

Transmitter 720 may transmit (e.g., in a shared radio frequency spectrum band) a radio frame with an HE signal field that includes the random bit sequence as padding bits, a radio frame with the HE signal field that includes each bit in the set of bits having the reversed binary value, a radio frame with the HE signal field that includes a scrambled set of bits of the HE signal field, or a radio frame with the HE signal field that includes a set of symbols having a phase rotation.

Figure 8:
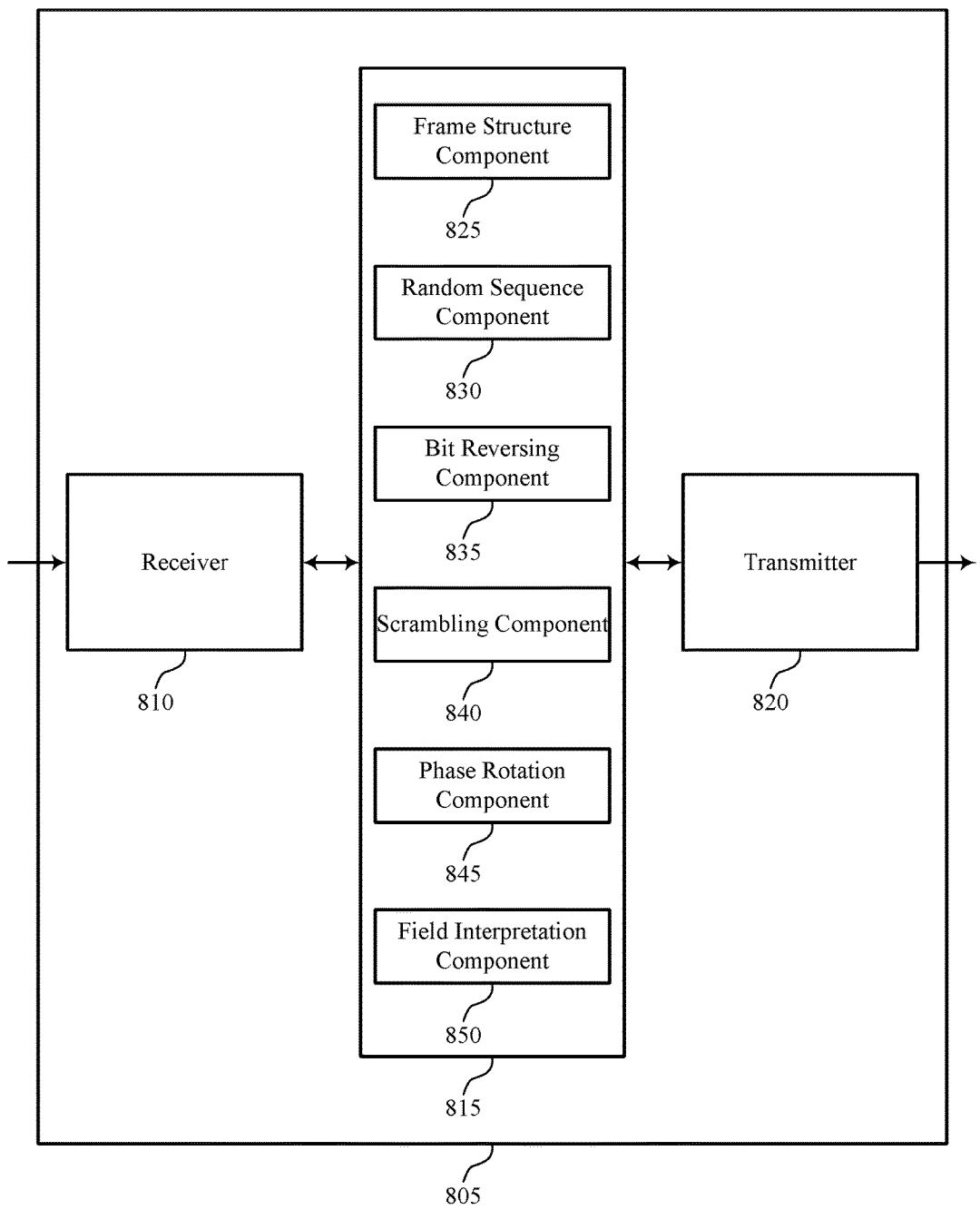

FIG. 8 shows a block diagram 800 of a device 805 that supports PAPR reduction in HE signal fields in accordance with various aspects of the present disclosure. Device 805 may be an example of aspects of a device 705 or an AP 105 or STA 115 as described with reference to FIGS. 1, 2 and 7. Wireless device 805 may include receiver 810, communication manager 815, and transmitter 820. Device 805 may also include a processor. Each of these components may be in communication with one another (e.g., via one or more buses).

Receiver 810 may receive information such as packets, user data, or control information associated with various information channels (e.g., control channels, data channels, and information related to PAPR reduction in HE signal fields, etc.). Information may be passed on to other components of the device. The receiver 810 may be an example of aspects of the transceiver 1040 described with reference to FIG. 10.

Communication manager 815 may also include frame structure component 825, random sequence component 830, bit reversing component 835, scrambling component 840, phase rotation component 845, and field interpretation component 850. Communication manager 815 may be an example of aspects of the communication manager 1015 described with reference to FIG. 10.

Frame structure component 825 may identify a radio frame structure that includes an HE signal field and an HE data field for communicating in a shared radio frequency spectrum band. In some cases, the radio frame includes at least one of an HE signaling field, an HE preamble, or an HE data field. In some cases, the HE signal field includes at least one of an HE preamble, a L-STF, a L-LTF, a L-SIG, a repeated L-SIG, an HE SIG-A field or an HE SIG-B field. In some cases, the HE signal field includes at least one of a common field, a user specific field, a downlink/uplink (DL/UL) bit, a format bit, a basic service set (BSS) color field, a spatial reuse field, a transmission opportunity (TxOP) field, a bandwidth field, an MCS field, a cyclic prefix (CP) and long training field (LTF) size field, a coding field, a number of space-time streams field, a space-time block coding (STBC) field, a transmission beamforming (TxBF) field, a DCM field, a packet extension field, a beam change field, a Doppler field, a CRC field, a tail field, a SIG-B MCS field, a SIG-B DCM field, a SIG-B number of symbols field, a SIG-B compression mode field, a number of HE-LTF symbols field, a LDPC extra symbol, a STAID, a spatial configuration field, a tail bit, one or more padding bits, or any combination thereof.

Random sequence component 830 may generate the HE signal field using a random bit sequence as padding bits for an OFDM symbol and identify a random bit sequence used as padding bits of an OFDM symbol in the HE signal field.

Bit reversing component 835 may reverse a binary value of each bit in a set of bits of the HE signal field, reverse the binary value of each bit in the set of bits includes setting one or more zeros to ones and setting one or more ones to zeros, and determine that a binary value of each bit in a set of bits of the HE signal field is reversed from an intended value. In some cases, the set of bits of the HE signal field includes a STAID. In some cases, the STAID includes a broadcast RU. In some cases, the set of bits of the HE signal field includes an MCS field. In some cases, the set of bits of the HE signal field includes a STAID. In some cases, the STAID includes a broadcast RU. In some cases, the set of bits of the HE signal field includes an MCS field.

Scrambling component 840 may scramble a set of bits of the HE signal field and determine that a set of bits of the HE signal field is scrambled. In some cases, scrambling the set of bits of the HE signal field includes applying an XOR function to the set of bits of the HE signal field and a scrambling code. In some cases, the set of bits are scrambled based on an MCS of the HE signal field. In some cases, the set of bits are scrambled using a predetermined seed or a pseudorandom nonzero seed. In some cases, the set of bits are scrambled using a scrambling code selected to reduce a PAPR. In some cases, interpreting the HE signal field includes: descrambling the scrambled bits includes using a descrambler with a predetermined seed or a pseudorandom nonzero seed on the scrambled bits.

Phase rotation component 845 may apply a phase rotation to a set of symbols of the HE signal field, determine a phase rotation of a set of symbols of the HE signal field of the radio frame, and adjust for the phase rotation of the set of symbols of the HE signal field before demodulating the set of symbols according to a QAM mapping. In some cases, the phase rotation applied to the set of symbols of the HE signal field is applied on a set of tones after QAM mapping.

Field interpretation component 850 may interpret the HE signal field based on identifying the random bit sequence used as the padding bits, according to an intended value, or based on the determination that the set of bits of the HE signal field is scrambled. In some cases, the HE signal field is interpreted based on an MCS of the HE signal field.

Transmitter 820 may transmit signals generated by other components of the device. In some examples, the transmitter 820 may be collocated with a receiver 810 in a transceiver module. For example, the transmitter 820 may be an example of aspects of the transceiver 1040 described with reference to FIG. 10. The transmitter 820 may include a single antenna, or it may include a set of antennas.

Figure 9:
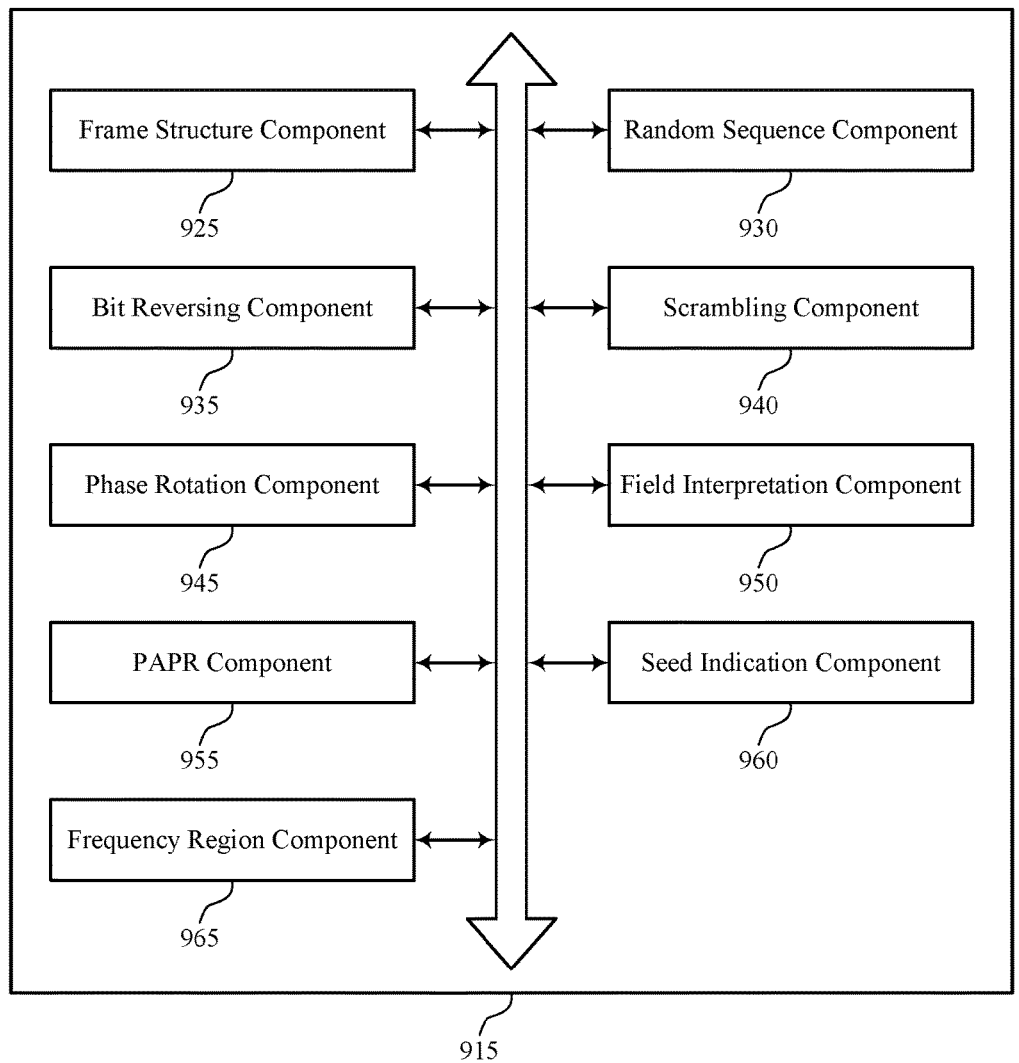

FIG. 9 shows a block diagram 900 of a communication manager 915 that supports PAPR reduction in HE signal fields in accordance with various aspects of the present disclosure. The communication manager 915 may be an example of aspects of a communication manager 715, a communication manager 815, or a communication manager 1015 described with reference to FIGS. 7, 8, and 10. The communication manager 915 may include frame structure component 925, random sequence component 930, bit reversing component 935, scrambling component 940, phase rotation component 945, and field interpretation component 950. Each of these modules may communicate, directly or indirectly, with one another (e.g., via one or more buses).

Frame structure component 925 may identify a radio frame structure that includes an HE signal field and an HE data field for communicating in a shared radio frequency spectrum band. Random sequence component 930 may generate the HE signal field using a random bit sequence as padding bits for an OFDM symbol and identify a random bit sequence used as padding bits of an OFDM symbol in the HE signal field.

Bit reversing component 935 may reverse a binary value of each bit in a set of bits of the HE signal field, reverse the binary value of each bit in the set of bits includes setting one or more zeros to ones and setting one or more ones to zeros, and determine that a binary value of each bit in a set of bits of the HE signal field is reversed from an intended value.

Scrambling component 940 may scramble a set of bits of the HE signal field and determine that a set of bits of the HE signal field is scrambled.

Phase rotation component 945 may apply a phase rotation to a set of symbols of the HE signal field, determine a phase rotation of a set of symbols of the HE signal field of the radio frame, and adjust for the phase rotation of the set of symbols of the HE signal field before demodulating the set of symbols according to a QAM mapping. Field interpretation component 950 may interpret the HE signal field.

PAPR component 955 may identify a PAPR condition where the HE signal field is generated using the random bit sequence based on the PAPR condition and determine that the HE signal field includes a number of consecutive bits with a same value, where the PAPR condition is identified based on the number of consecutive bits exceeding a threshold. PAPR component 955 may identify an MCS for the radio frame, where the PAPR condition is identified based on the MCS, identify a PAPR condition where the binary value of each bit in the set of bits is reversed based on the PAPR condition, identify a PAPR condition, where the random bit sequence used as padding bits is identified based on the PAPR condition, identify an MCS in the HE signal field, where the PAPR condition is identified based on the MCS, and identify a PAPR condition, where the determination that the binary value of each bit in the set of bits of the HE signal field is reversed from the intended value is based on the PAPR condition. In some cases, the consecutive bits with the same value include bits from a set of OFDM symbols. In some cases, the set of bits of the HE signal field includes consecutive bits of the HE signal field.

Seed indication component 960 may receive signaling that indicates the pseudorandom nonzero seed and transmit signaling that indicates the pseudorandom nonzero seed.

Frequency region component 965 may identify a set of frequency regions in the shared radio frequency spectrum band, where the phase rotation is applied to each frequency region of the set and identify a set of frequency regions in the shared radio frequency spectrum band, where the phase rotation is determined for each frequency region of the set.

Figure 10:
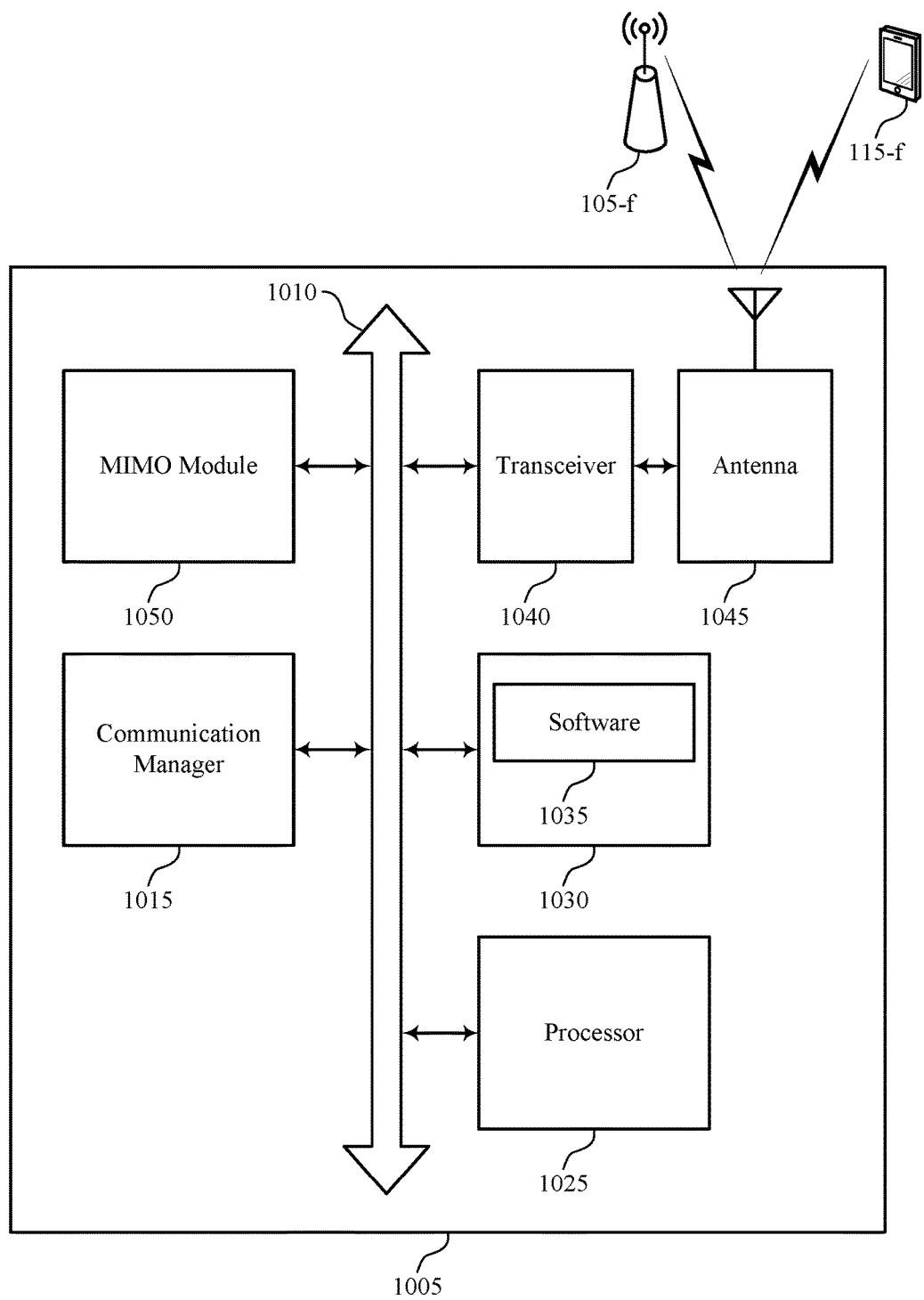
FIG. 10 illustrates a block diagram of a system including a wireless device that supports PAPR reduction in HE signal fields in accordance with aspects of the present disclosure.

FIG. 10 shows a diagram of a system 1000 including a device 1005 that supports PAPR reduction in HE signal fields in accordance with various aspects of the present disclosure. Device 1005 may be an example of a device 705, device 805, or an AP 105 or STA 115 as described above, e.g., with reference to FIGS. 1, 2, 7 and 8.

Device 1005 may include components for bi-directional voice and data communications including components for transmitting and receiving communications, including communication manager 1015, processor 1025, memory 1030, software 1035, transceiver 1040, antenna 1045, and MIMO module 1050.

Processor 1025 may include an intelligent hardware device, (e.g., a central processing unit (CPU), a microcontroller, an application specific integrated circuit (ASIC), etc.)

Memory 1030 may include random access memory (RAM) and read only memory (ROM). The memory 1030 may store computer-readable, computer-executable software 1035 including instructions that, when executed, cause the processor to perform various functions described herein. In some cases, the memory 1030 can contain, among other things, a Basic Input-Output system (BIOS) which may control basic hardware and/or software operations such as the interaction with peripheral components or devices.

Software 1035 may include code to implement aspects of the present disclosure, including code to support PAPR reduction in HE signal fields. Software 1035 can be stored in a non-transitory computer-readable medium such as system memory or other memory. In some cases, the software 1035 may not be directly executable by the processor but may cause a computer (e.g., when compiled and executed) to perform functions described herein.

Transceiver 1040 may communicate bi-directionally, via one or more antennas, wired, or wireless links as described above. For example, the transceiver 1040 may represent a wireless transceiver and may communicate bi-directionally with another wireless transceiver. The transceiver 1040 may also include a modem to modulate the packets and provide the modulated packets to the antennas for transmission, and to demodulate packets received from the antennas.

In some cases, the wireless device may include a single antenna 1045. However, in some cases the device may have more than one antenna 1045, which may be capable of concurrently transmitting or receiving multiple wireless transmissions.

MIMO module 1050 may enable multiple-input, multiple-output (MIMO) operations. Device 1005 may be configured to collaboratively communicate with multiple devices through, for example, Multiple Input Multiple Output (MIMO), or other schemes. MIMO techniques use multiple antennas on the base stations or multiple antennas on the wireless device to take advantage of multipath environments to transmit multiple data streams. Device 1005 may communicate with, for example, AP 105-*f* or STA 115-*f*, or both.

Figure 11:
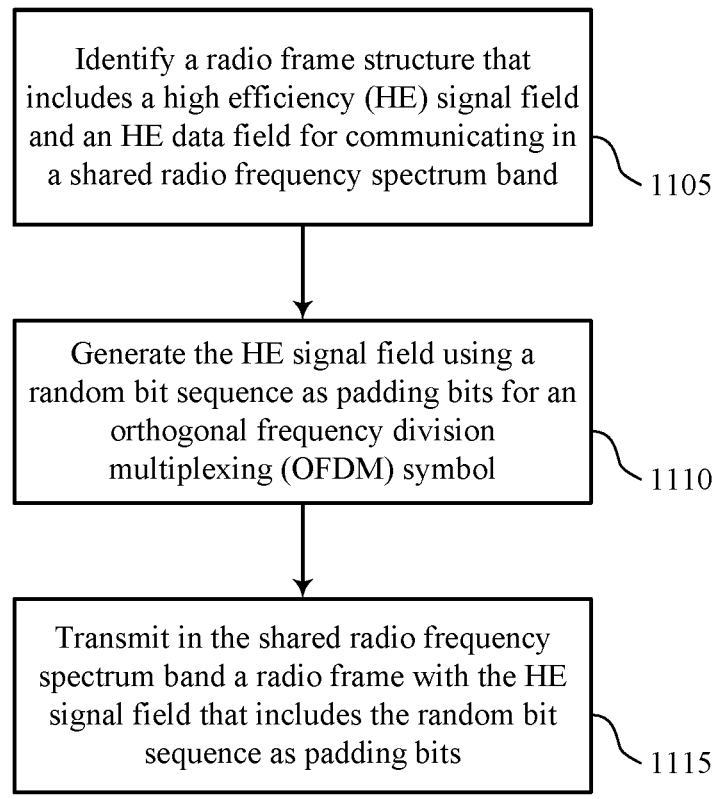
FIGS. 11 through 18 illustrate methods for PAPR reduction in HE signal fields in accordance with aspects of the present disclosure.

FIG. 11 shows a flowchart illustrating a method 1100 for PAPR reduction in HE signal fields in accordance with various aspects of the present disclosure. The operations of method 1100 may be implemented by an AP 105 or STA 115 or its components as described herein. For example, the operations of method 1100 may be performed by a communication manager as described with reference to FIGS. 7 through 9. In some examples, an AP 105 or STA 115 may execute a set of codes to control the functional elements of the device to perform the functions described below. Additionally or alternatively, the AP 105 or STA 115 may perform aspects the functions described below using special-purpose hardware.

At block 1105, the AP 105 or STA 115 may identify a radio frame structure that includes an HE signal field and an HE data field for communicating in a shared radio frequency spectrum band. The operations of block 1105 may be performed according to the methods described with reference to FIGS. 2 through 6. In certain examples, aspects of the operations of block 1105 may be performed by a frame structure component as described with reference to FIGS. 7 through 9.

At block 1110, the AP 105 or STA 115 may generate the HE signal field using a random bit sequence as padding bits for an OFDM symbol. The operations of block 1110 may be performed according to the methods described with reference to FIGS. 2 through 6. In certain examples, aspects of the operations of block 1110 may be performed by a random sequence component as described with reference to FIGS. 7 through 9.

At block 1115, the AP 105 or STA 115 may transmit in the shared radio frequency spectrum band a radio frame with the HE signal field that includes the random bit sequence as padding bits. The operations of block 1115 may be performed according to the methods described with reference to FIGS. 2 through 6. In certain examples, aspects of the operations of block 1115 may be performed by a transmitter as described with reference to FIGS. 7 through 9.

Figure 12:
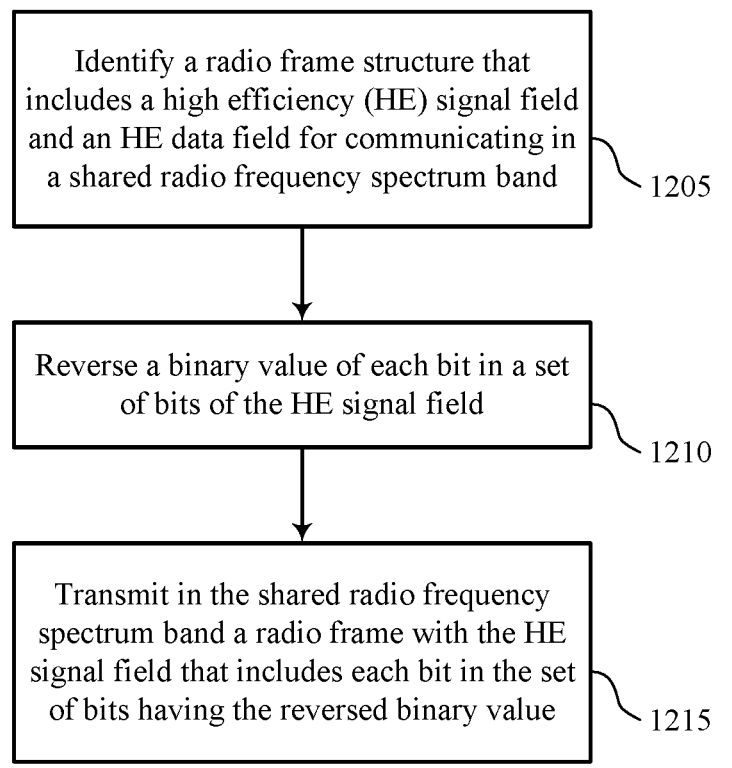

FIG. 12 shows a flowchart illustrating a method 1200 for PAPR reduction in HE signal fields in accordance with various aspects of the present disclosure. The operations of method 1200 may be implemented by an AP 105 or STA 115 or its components as described herein. For example, the operations of method 1200 may be performed by a communication manager as described with reference to FIGS. 7 through 9. In some examples, an AP 105 or STA 115 may execute a set of codes to control the functional elements of the device to perform the functions described below. Additionally or alternatively, the AP 105 or STA 115 may perform aspects the functions described below using special-purpose hardware.

At block 1205, the AP 105 or STA 115 may identify a radio frame structure that includes an HE signal field and an HE data field for communicating in a shared radio frequency spectrum band. The operations of block 1205 may be performed according to the methods described with reference to FIGS. 2 through 6. In certain examples, aspects of the operations of block 1205 may be performed by a frame structure component as described with reference to FIGS. 7 through 9.

At block 1210, the AP 105 or STA 115 may reverse a binary value of each bit in a set of bits of the HE signal field. The operations of block 1210 may be performed according to the methods described with reference to FIGS. 2 through 6. In certain examples, aspects of the operations of block 1210 may be performed by a bit reversing component as described with reference to FIGS. 7 through 9.

At block 1215, the AP 105 or STA 115 may transmit in the shared radio frequency spectrum band a radio frame with the HE signal field that includes each bit in the set of bits having the reversed binary value. The operations of block 1215 may be performed according to the methods described with reference to FIGS. 2 through 6. In certain examples, aspects of the operations of block 1215 may be performed by a transmitter as described with reference to FIGS. 7 through 9.

Figure 13:
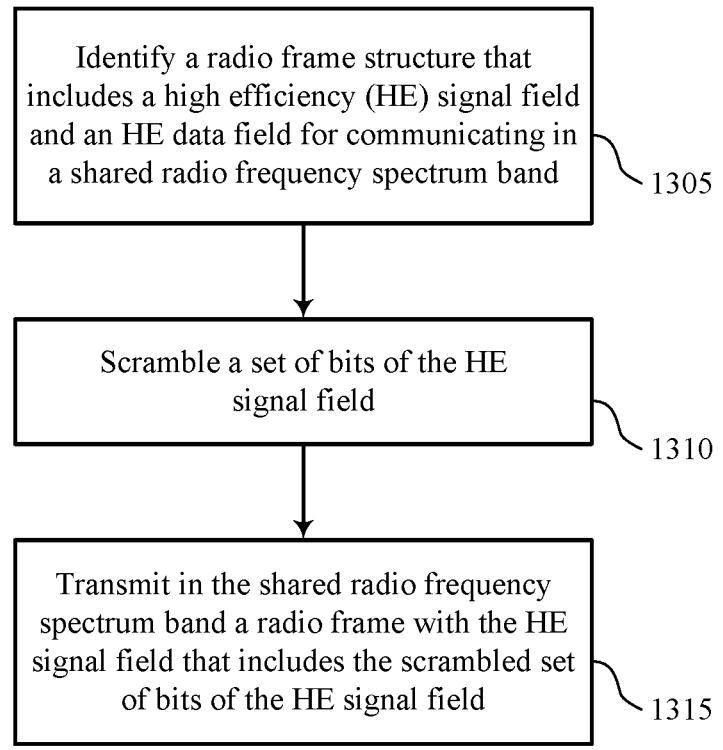

FIG. 13 shows a flowchart illustrating a method 1300 for PAPR reduction in HE signal fields in accordance with various aspects of the present disclosure. The operations of method 1300 may be implemented by an AP 105 or STA 115 or its components as described herein. For example, the operations of method 1300 may be performed by a communication manager as described with reference to FIGS. 7 through 9. In some examples, an AP 105 or STA 115 may execute a set of codes to control the functional elements of the device to perform the functions described below. Additionally or alternatively, the AP 105 or STA 115 may perform aspects the functions described below using special-purpose hardware.

At block 1305, the AP 105 or STA 115 may identify a radio frame structure that includes an HE signal field and an HE data field for communicating in a shared radio frequency spectrum band. The operations of block 1305 may be performed according to the methods described with reference to FIGS. 2 through 6. In certain examples, aspects of the operations of block 1305 may be performed by a frame structure component as described with reference to FIGS. 7 through 9.

At block 1310, the AP 105 or STA 115 may scramble a set of bits of the HE signal field. The operations of block 1310 may be performed according to the methods described with reference to FIGS. 2 through 6. In certain examples, aspects of the operations of block 1310 may be performed by a scrambling component as described with reference to FIGS. 7 through 9.

At block 1315, the AP 105 or STA 115 may transmit in the shared radio frequency spectrum band a radio frame with the HE signal field that includes the scrambled set of bits of the HE signal field. The operations of block 1315 may be performed according to the methods described with reference to FIGS. 2 through 6. In certain examples, aspects of the operations of block 1315 may be performed by a transmitter as described with reference to FIGS. 7 through 9.

Figure 14:
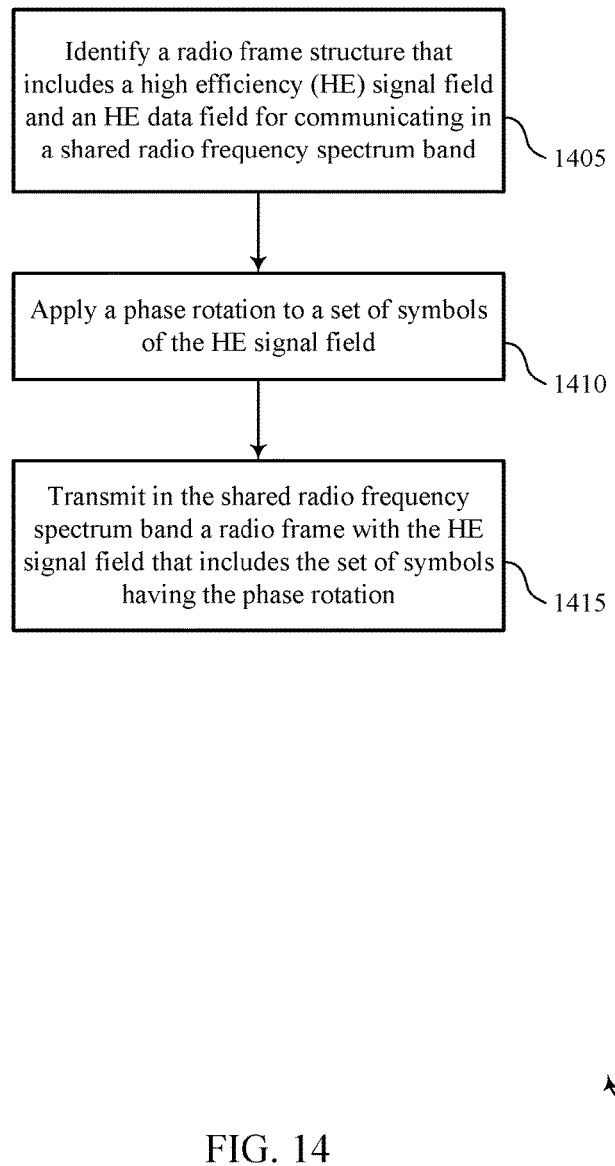

FIG. 14 shows a flowchart illustrating a method 1400 for PAPR reduction in HE signal fields in accordance with various aspects of the present disclosure. The operations of method 1400 may be implemented by an AP 105 or STA 115 or its components as described herein. For example, the operations of method 1400 may be performed by a communication manager as described with reference to FIGS. 7 through 9. In some examples, an AP 105 or STA 115 may execute a set of codes to control the functional elements of the device to perform the functions described below. Additionally or alternatively, the AP 105 or STA 115 may perform aspects the functions described below using special-purpose hardware.

At block 1405, the AP 105 or STA 115 may identify a radio frame structure that includes an HE signal field and an HE data field for communicating in a shared radio frequency spectrum band. The operations of block 1405 may be performed according to the methods described with reference to FIGS. 2 through 6. In certain examples, aspects of the operations of block 1405 may be performed by a frame structure component as described with reference to FIGS. 7 through 9.

At block 1410, the AP 105 or STA 115 may apply a phase rotation to a set of symbols of the HE signal field. The operations of block 1410 may be performed according to the methods described with reference to FIGS. 2 through 6. In certain examples, aspects of the operations of block 1410 may be performed by a phase rotation component as described with reference to FIGS. 7 through 9.

At block 1415, the AP 105 or STA 115 may transmit in the shared radio frequency spectrum band a radio frame with the HE signal field that includes the set of symbols having the phase rotation. The operations of block 1415 may be performed according to the methods described with reference to FIGS. 2 through 6. In certain examples, aspects of the operations of block 1415 may be performed by a transmitter as described with reference to FIGS. 7 through 9.

Figure 15:
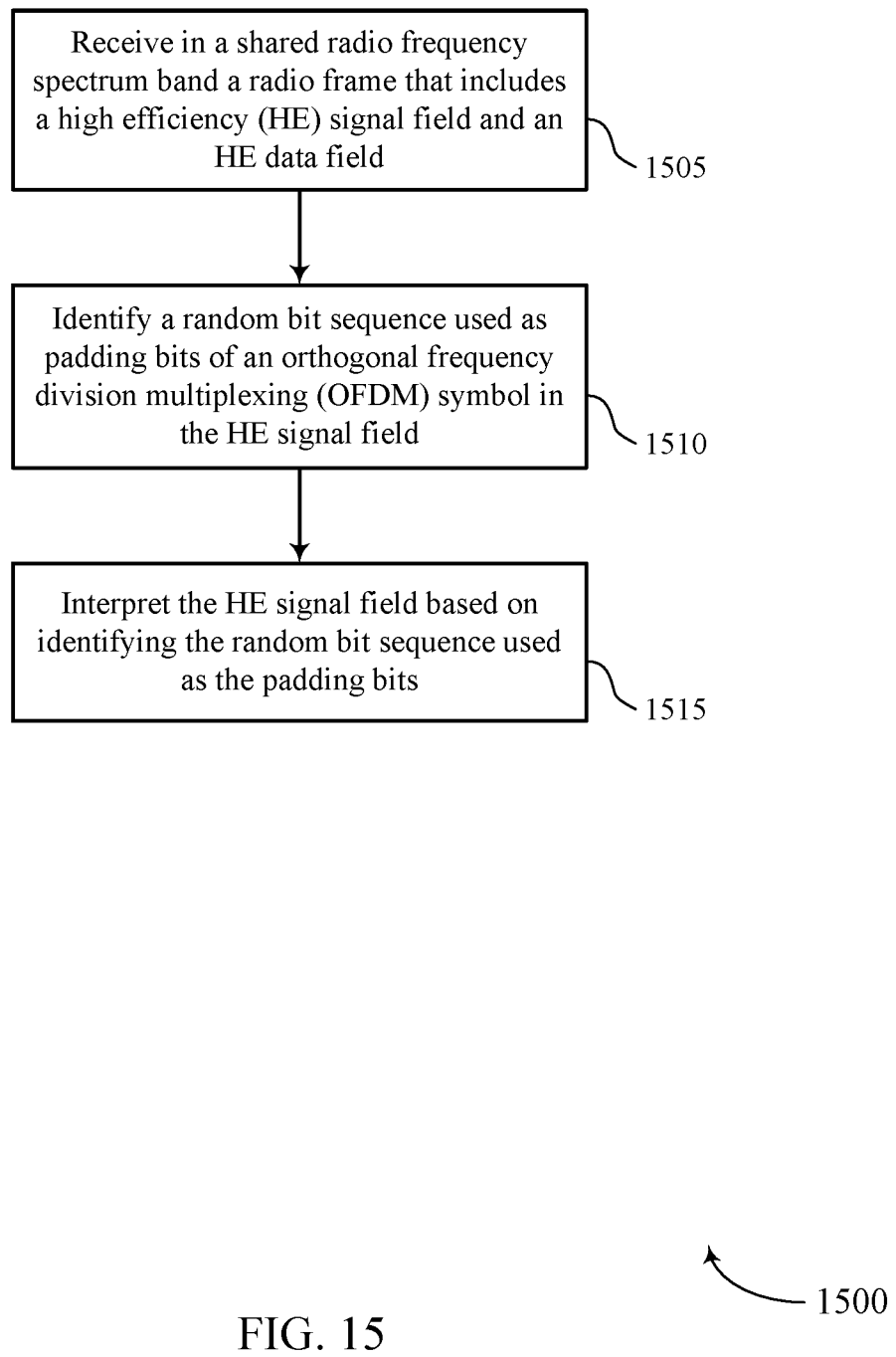

FIG. 15 shows a flowchart illustrating a method 1500 for PAPR reduction in HE signal fields in accordance with various aspects of the present disclosure. The operations of method 1500 may be implemented by an AP 105 or STA 115 or its components as described herein. For example, the operations of method 1500 may be performed by a communication manager as described with reference to FIGS. 7 through 9. In some examples, an AP 105 or STA 115 may execute a set of codes to control the functional elements of the device to perform the functions described below. Additionally or alternatively, the AP 105 or STA 115 may perform aspects the functions described below using special-purpose hardware.

At block 1505, the AP 105 or STA 115 may receive in a shared radio frequency spectrum band a radio frame that includes an HE signal field and an HE data field. The operations of block 1505 may be performed according to the methods described with reference to FIGS. 2 through 6. In certain examples, aspects of the operations of block 1505 may be performed by a receiver as described with reference to FIGS. 7 through 9.

At block 1510, the AP 105 or STA 115 may identify a random bit sequence used as padding bits of an OFDM symbol in the HE signal field. The operations of block 1510 may be performed according to the methods described with reference to FIGS. 2 through 6. In certain examples, aspects of the operations of block 1510 may be performed by a random sequence component as described with reference to FIGS. 7 through 9.

At block 1515, the AP 105 or STA 115 may interpret the HE signal field based on identifying the random bit sequence used as the padding bits. The operations of block 1515 may be performed according to the methods described with reference to FIGS. 2 through 6. In certain examples, aspects of the operations of block 1515 may be performed by a field interpretation component as described with reference to FIGS. 7 through 9.

Figure 16:
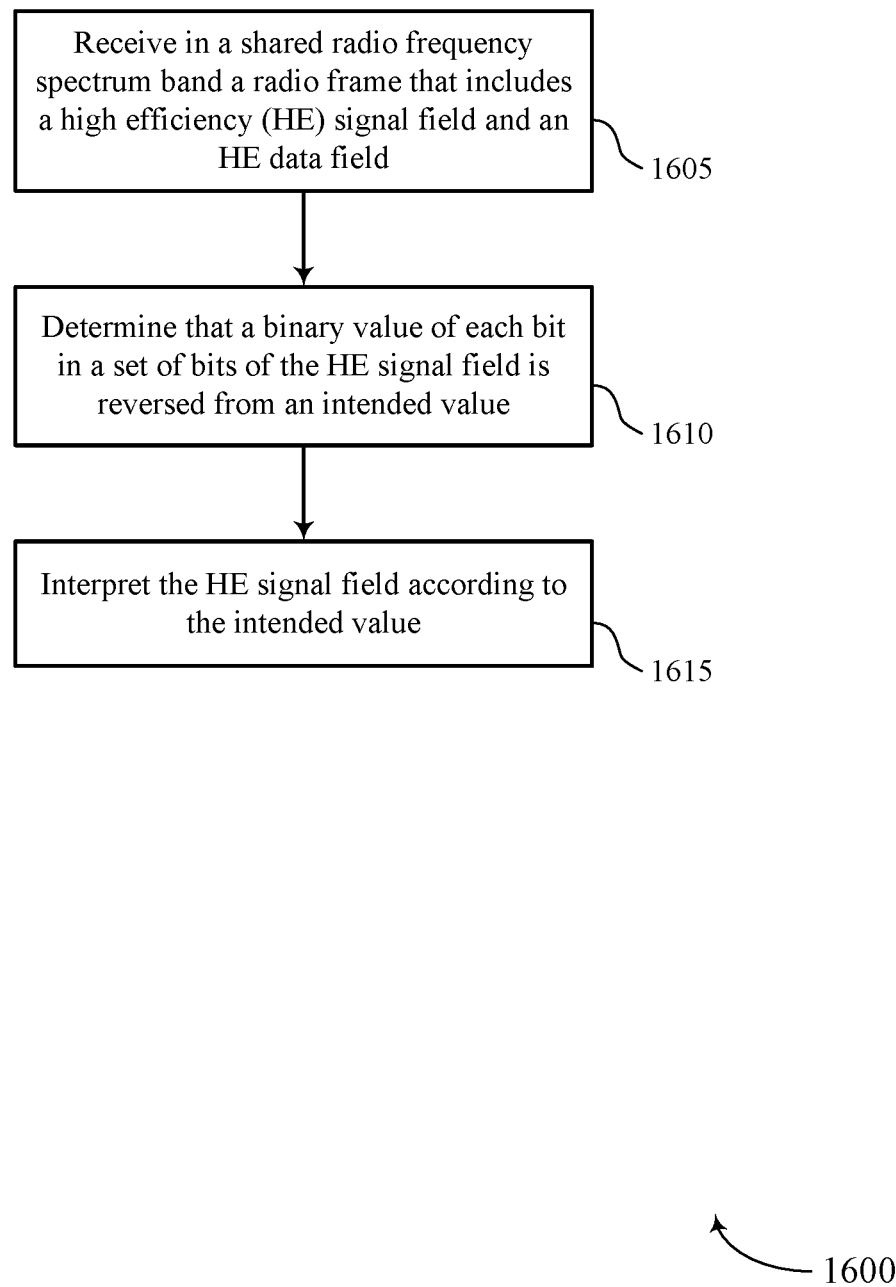

FIG. 16 shows a flowchart illustrating a method 1600 for PAPR reduction in HE signal fields in accordance with various aspects of the present disclosure. The operations of method 1600 may be implemented by an AP 105 or STA 115 or its components as described herein. For example, the operations of method 1600 may be performed by a communication manager as described with reference to FIGS. 7 through 9. In some examples, an AP 105 or STA 115 may execute a set of codes to control the functional elements of the device to perform the functions described below. Additionally or alternatively, the AP 105 or STA 115 may perform aspects the functions described below using special-purpose hardware.

At block 1605, the AP 105 or STA 115 may receive in a shared radio frequency spectrum band a radio frame that includes an HE signal field and an HE data field. The operations of block 1605 may be performed according to the methods described with reference to FIGS. 2 through 6. In certain examples, aspects of the operations of block 1605 may be performed by a receiver as described with reference to FIGS. 7 through 9.

At block 1610, the AP 105 or STA 115 may determine that a binary value of each bit in a set of bits of the HE signal field is reversed from an intended value. The operations of block 1610 may be performed according to the methods described with reference to FIGS. 2 through 6. In certain examples, aspects of the operations of block 1610 may be performed by a bit reversing component as described with reference to FIGS. 7 through 9.

At block 1615, the AP 105 or STA 115 may interpret the HE signal field according to the intended value. The operations of block 1615 may be performed according to the methods described with reference to FIGS. 2 through 6. In certain examples, aspects of the operations of block 1615 may be performed by a field interpretation component as described with reference to FIGS. 7 through 9.

Figure 17:
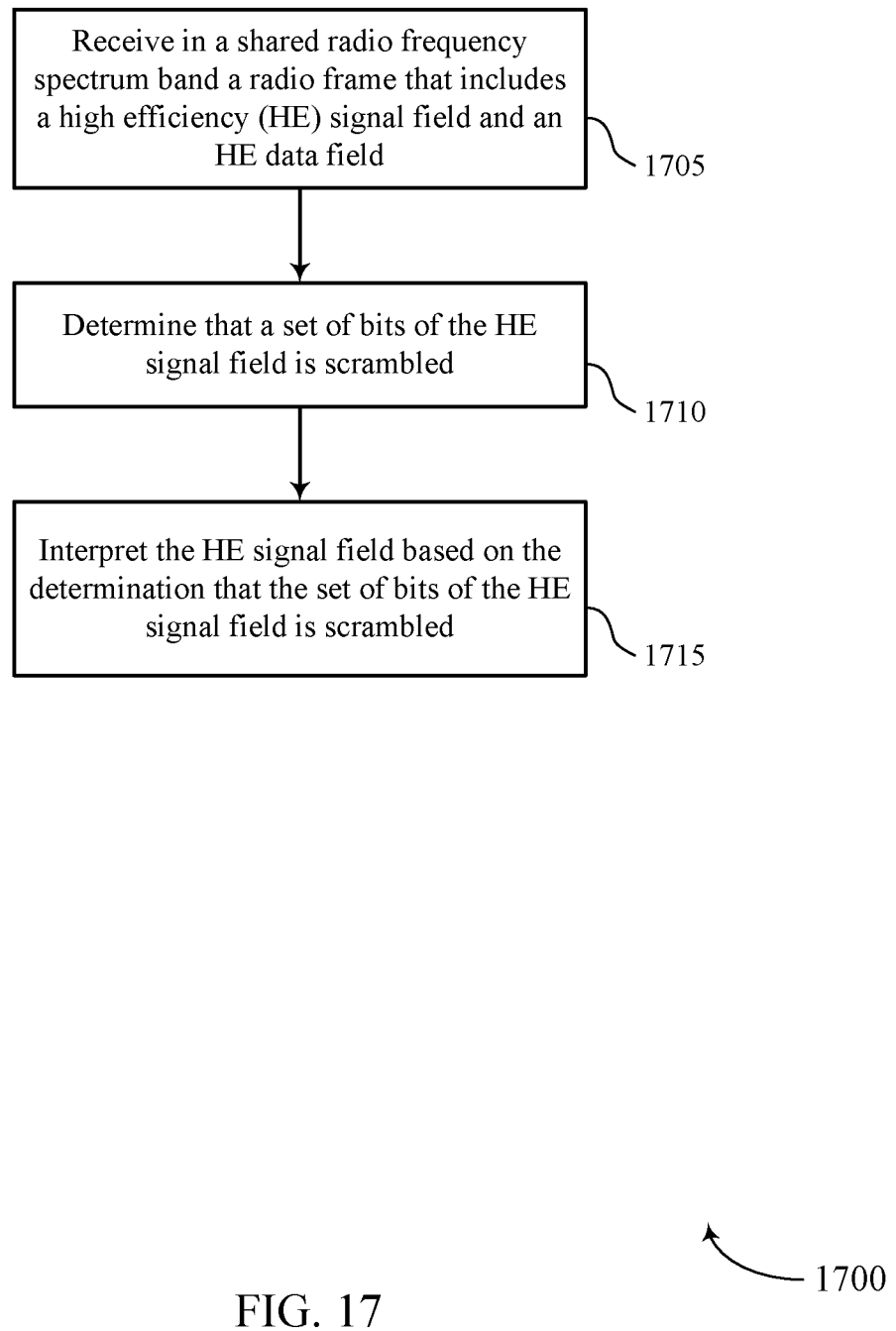

FIG. 17 shows a flowchart illustrating a method 1700 for PAPR reduction in HE signal fields in accordance with various aspects of the present disclosure. The operations of method 1700 may be implemented by an AP 105 or STA 115 or its components as described herein. For example, the operations of method 1700 may be performed by a communication manager as described with reference to FIGS. 7 through 9. In some examples, an AP 105 or STA 115 may execute a set of codes to control the functional elements of the device to perform the functions described below. Additionally or alternatively, the AP 105 or STA 115 may perform aspects the functions described below using special-purpose hardware.

At block 1705, the AP 105 or STA 115 may receive in a shared radio frequency spectrum band a radio frame that includes an HE signal field and an HE data field. The operations of block 1705 may be performed according to the methods described with reference to FIGS. 2 through 6. In certain examples, aspects of the operations of block 1705 may be performed by a receiver as described with reference to FIGS. 7 through 9.

At block 1710, the AP 105 or STA 115 may determine that a set of bits of the HE signal field is scrambled. The operations of block 1710 may be performed according to the methods described with reference to FIGS. 2 through 6. In certain examples, aspects of the operations of block 1710 may be performed by a scrambling component as described with reference to FIGS. 7 through 9.

At block 1715, the AP 105 or STA 115 may interpret the HE signal field based on the determination that the set of bits of the HE signal field is scrambled. The operations of block 1715 may be performed according to the methods described with reference to FIGS. 2 through 6. In certain examples, aspects of the operations of block 1715 may be performed by a field interpretation component as described with reference to FIGS. 7 through 9.

Figure 18:
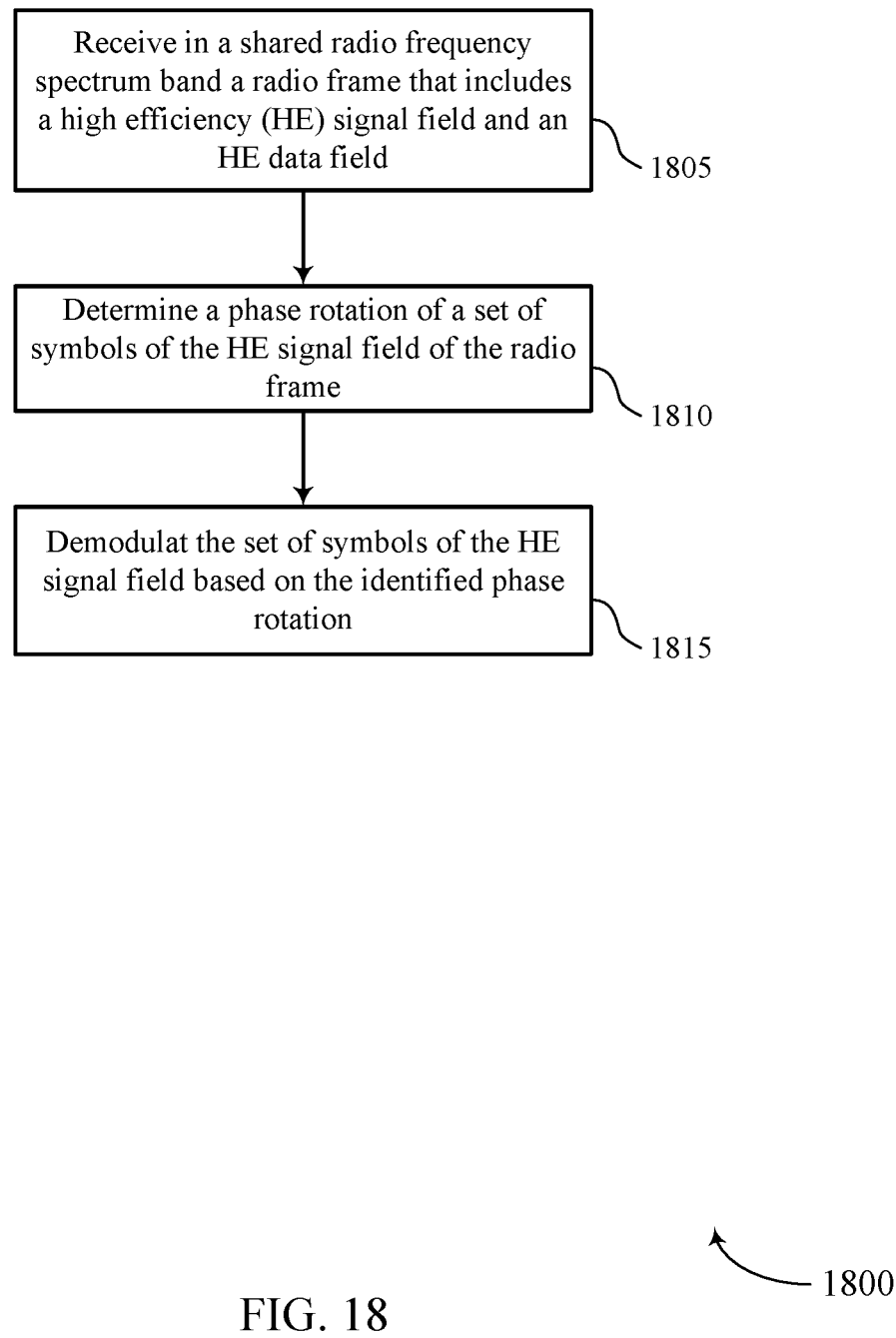

FIG. 18 shows a flowchart illustrating a method 1800 for PAPR reduction in HE signal fields in accordance with various aspects of the present disclosure. The operations of method 1800 may be implemented by an AP 105 or STA 115 or its components as described herein. For example, the operations of method 1800 may be performed by a communication manager as described with reference to FIGS. 7 through 9. In some examples, an AP 105 or STA 115 may execute a set of codes to control the functional elements of the device to perform the functions described below. Additionally or alternatively, the AP 105 or STA 115 may perform aspects the functions described below using special-purpose hardware.

At block 1805, the AP 105 or STA 115 may receive in a shared radio frequency spectrum band a radio frame that includes an HE signal field and an HE data field. The operations of block 1805 may be performed according to the methods described with reference to FIGS. 2 through 6. In certain examples, aspects of the operations of block 1805 may be performed by a receiver as described with reference to FIGS. 7 through 9.

At block 1810, the AP 105 or STA 115 may determine a phase rotation of a set of symbols of the HE signal field of the radio frame. The operations of block 1810 may be performed according to the methods described with reference to FIGS. 2 through 6. In certain examples, aspects of the operations of block 1810 may be performed by a phase rotation component as described with reference to FIGS. 7 through 9.

At block 1815, the AP 105 or STA 115 may demodulate the set of symbols of the HE signal field based on the identified phase rotation. The operations of block 1815 may be performed according to the methods described with reference to FIGS. 2 through 6. In certain examples, aspects of the operations of block 1815 may be performed by a receiver as described with reference to FIGS. 7 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLANs 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a radio frame structure that includes a high efficiency (HE) signal field and an HE data field for communication;
   applying a phase rotation to every other data tone of a portion of the HE signal field, wherein the HE signal field comprises a plurality of unrotated data tones preceding the portion; and
   transmitting a radio frame with the HE signal field that includes the portion having the phase rotation applied to every other data tone.

2. The method of claim 1, wherein the phase rotation is based at least in part on a high peak-to-average power ratio (PAPR) condition.

3. The method of claim 1, wherein the phase rotation applied to every other data tone of the portion of the HE signal field is applied on a set of tones after quadrature amplitude modulation (QAM) mapping.

4. The method of claim 1, further comprising:
   identifying a plurality of frequency regions, wherein the phase rotation is applied to each frequency region of the plurality.

5. The method of claim 1, further comprising:
   dividing the HE signal field into one or more segments; and
   applying the phase rotation to each of the one or more segments.

6. The method of claim 1, wherein the HE signal field comprises 56 tones, and wherein the 56 tones include 52 data tones.

7. The method of claim 6, wherein the phase rotation for every kth data tone of the HE signal field comprises:

$1$ for $0 \leq k \leq 26$ $(-1)^k$ for $26 \leq k \leq 52$.

8. The method of claim 1, wherein the HE signal field comprises an HE SIG-A field or an HE SIG-B field.

9. The method of claim 1, wherein the HE signal field comprises a 20 MHz channel.

10. The method of claim 1, wherein the phase rotation comprises a dual carrier modulation (DCM) binary phase shift keying (BPSK) bit mapping.

11. An apparatus for wireless communication, comprising:
    means for identifying a radio frame structure that includes a high efficiency (HE) signal field and an HE data field for communication;
    means for applying a phase rotation to every other data tone of a portion of the HE signal field, wherein the HE signal field comprises a plurality of unrotated data tones preceding the portion; and
    means for transmitting a radio frame with the HE signal field that includes the portion having the phase rotation applied to every other data tone.

12. The apparatus of claim 11, wherein:
    the phase rotation is based at least in part on a high peak-to-average power ratio (PAPR) condition.

13. The apparatus of claim 11, wherein:
    the phase rotation applied to every other data tone of the portion of the HE signal field is applied on a set of tones after quadrature amplitude modulation (QAM) mapping.

14. The apparatus of claim 11, further comprising:
means for identifying a plurality of frequency regions, wherein the phase rotation is applied to each frequency region of the plurality.

15. The apparatus of claim 11, further comprising:
means for dividing the HE signal field into one or more segments; and
means for applying the phase rotation to each of the one or more segments.

16. The apparatus of claim 11, wherein:
the HE signal field comprises 56 tones, and wherein the 56 tones include 52 data tones.

17. The apparatus of claim 16, wherein the phase rotation for every kth data tone of the HE signal field comprises:

1 for $0 \leq k \leq 26$ $(-1)^k$ for $26 \leq k \leq 52$.

18. The apparatus of claim 11, wherein:
the HE signal field comprises an HE signal A (SIG-A) field or an HE signal B (SIG-B) field.

19. The apparatus of claim 11, wherein:
the HE signal field comprises a 20 MHz channel.

20. The apparatus of claim 11, wherein:
the phase rotation comprises a dual carrier modulation (DCM) binary phase shift keying (BPSK) bit mapping.

21. An apparatus for wireless communication, comprising:
a processor;
memory in electronic communication with the processor; and
instructions stored in the memory and operable, when executed by the processor, to cause the apparatus to:
identify a radio frame structure that includes a high efficiency (HE) signal field and an HE data field for communication;
apply a phase rotation to every other data tone of a portion of the HE signal field, wherein the HE signal field comprises a plurality of unrotated data tones preceding the portion; and
transmit a radio frame with the HE signal field that includes the portion having the phase rotation to every other data tone.

22. The apparatus of claim 21, wherein:
the phase rotation is based at least in part on a high peak-to-average power ratio (PAPR) condition.

23. The apparatus of claim 21, wherein:
the phase rotation applied to every other data tone of the portion of the HE signal field is applied on a set of tones after quadrature amplitude modulation (QAM) mapping.

24. The apparatus of claim 21, wherein the instructions are further executable by the processor to:
identify a plurality of frequency regions, wherein the phase rotation is applied to each frequency region of the plurality.

25. The apparatus of claim 21, wherein the instructions are further executable by the processor to:
divide the HE signal field into one or more segments; and
apply the phase rotation to each of the one or more segments.

26. The apparatus of claim 21, wherein:
the HE signal field comprises 56 tones, and wherein the 56 tones include 52 data tones.

27. The apparatus of claim 26, wherein the phase rotation for every kth data tone of the HE signal field comprises:

1 for $0 \leq k \leq 26$ $(-1)^k$ for $26 \leq k \leq 52$.

28. The apparatus of claim 21, wherein:
the HE signal field comprises an HE signal A (SIG-A) field or an HE signal B (SIG-B) field.

29. The apparatus of claim 21, wherein:
the phase rotation comprises a dual carrier modulation (DCM) binary phase shift keying (BPSK) bit mapping.

30. A non-transitory computer readable medium storing code for wireless communication, the code comprising instructions executable by a processor to:
identify a radio frame structure that includes a high efficiency (HE) signal field and an HE data field for communication;
apply a phase rotation to every other data tone of a portion of the HE signal field, wherein the HE signal field comprises a plurality of unrotated data tones preceding the portion; and
transmit a radio frame with the HE signal field that includes the portion having the phase rotation applied to every other data tone.

* * * * *

UNITED STATES PATENT AND TRADEMARK OFFICE
CERTIFICATE OF CORRECTION

PATENT NO. : 10,292,101 B2
APPLICATION NO. : 15/588360
DATED : May 14, 2019
INVENTOR(S) : Yang et al.

Page 1 of 1

It is certified that error appears in the above-identified patent and that said Letters Patent is hereby corrected as shown below:

In the Claims

Column 30, Lines 35-39 (approx.) should read:
7. The method of claim 6, wherein the phase rotation for every kth data tone of the HE signal field comprises:
1 for $0 \leq k < 26$
$(-1)^k$ for $26 \leq k < 52$.

Column 31, Lines 13-17 (approx.) should read:
17. The apparatus of claim 16, wherein the phase rotation for every kth data tone of the HE signal field comprises:
1 for $0 \leq k < 26$
$(-1)^k$ for $26 \leq k < 52$.

Column 32, Lines 19-24 (approx.) should read:
27. The apparatus of claim 26, wherein the phase rotation for every kth data tone of the HE signal field comprises:
1 for $0 \leq k < 26$
$(-1)^k$ for $26 \leq k < 52$.

Signed and Sealed this
Twenty-fifth Day of June, 2019

Andrei Iancu
*Director of the United States Patent and Trademark Office*